(12) United States Patent
Moon et al.

(10) Patent No.: US 12,316,736 B2
(45) Date of Patent: May 27, 2025

(54) DEVICE FOR SUPPORTING HOMOMORPHIC ENCRYPTION OPERATION AND OPERATING METHOD THEREOF

(71) Applicant: Samsung Electronics Co., Ltd., Suwon-si (KR)

(72) Inventors: Youngsik Moon, Suwon-si (KR); Jiyoup Kim, Hwaseong-si (KR); Hanbyeul Na, Yongin-si (KR); Hongrak Son, Anyang-si (KR); Hyunsang Cho, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 315 days.

(21) Appl. No.: 17/830,985

(22) Filed: Jun. 2, 2022

(65) Prior Publication Data

US 2023/0141837 A1    May 11, 2023

(30) Foreign Application Priority Data

Nov. 11, 2021 (KR) .................. 10-2021-0154972
Feb. 3, 2022 (KR) .................. 10-2022-0014246

(51) Int. Cl.
*H04L 9/00* (2022.01)
*G16Y 30/10* (2020.01)
*H04L 9/06* (2006.01)

(52) U.S. Cl.
CPC .............. *H04L 9/008* (2013.01); *G16Y 30/10* (2020.01); *H04L 9/0656* (2013.01)

(58) Field of Classification Search
CPC ...... H04L 9/008; H04L 9/0656; H04L 9/0894; H04L 2209/34; H04L 9/3033; G16Y 30/10
See application file for complete search history.

(56) References Cited

U.S. PATENT DOCUMENTS

| | | | |
|---|---|---|---|
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |

(Continued)

FOREIGN PATENT DOCUMENTS

| | | |
|---|---|---|
| JP | 6033741 B2 | 11/2016 |
| KR | 2021-0116299 A | 9/2021 |

(Continued)

OTHER PUBLICATIONS

U.S. Office Action dated Mar. 25, 2024 issued in co-pending U.S. Appl. No. 17/739,512.

(Continued)

*Primary Examiner* — Syed M Ahsan
(74) *Attorney, Agent, or Firm* — Harness, Dickey & Pierce, P.L.C.

(57) ABSTRACT

A device for supporting a homomorphic encryption operation includes a ciphertext conversion circuit configured to convert first ciphertexts corresponding to a first operation size to second ciphertexts corresponding to a second operation size, different from the first operation size, to convert the operated ciphertext having the second operation size to a third ciphertexts corresponding to the first operation size, and to perform a homomorphic encryption operation on the second ciphertexts.

9 Claims, 15 Drawing Sheets

(56) References Cited

U.S. PATENT DOCUMENTS

| | | | |
|---|---|---|---|
| 9,536,970 | B2 | 1/2017 | Seol et al. |
| 9,900,147 | B2 | 2/2018 | Laine et al. |
| 10,211,975 | B2 | 2/2019 | Loftus et al. |
| 10,333,696 | B2 | 6/2019 | Ahmed |
| 10,382,194 | B1 | 8/2019 | Miller et al. |
| 2013/0216044 | A1* | 8/2013 | Gentry ............... H04L 9/008 380/277 |
| 2014/0229734 | A1 | 8/2014 | Yamanaka et al. |
| 2015/0312031 | A1* | 10/2015 | Seo ................. H04L 9/008 380/28 |
| 2017/0149557 | A1 | 5/2017 | Bacon et al. |
| 2017/0180115 | A1 | 6/2017 | Laine et al. |
| 2019/0190713 | A1 | 6/2019 | Hirano et al. |
| 2020/0110546 | A1 | 4/2020 | Natanzon et al. |
| 2021/0075588 | A1 | 3/2021 | Khedr et al. |
| 2021/0081203 | A1 | 3/2021 | Vald et al. |
| 2021/0083841 | A1 | 3/2021 | Tueno et al. |
| 2021/0160048 | A1 | 5/2021 | Blatt et al. |
| 2021/0328765 | A1* | 10/2021 | Lee ............... H04L 9/008 |
| 2021/0328766 | A1 | 10/2021 | No et al. |
| 2021/0344479 | A1 | 11/2021 | Lee et al. |
| 2021/0376995 | A1 | 12/2021 | Ratha et al. |
| 2021/0376996 | A1 | 12/2021 | Moon et al. |
| 2022/0021515 | A1 | 1/2022 | Jang et al. |
| 2022/0085972 | A1 | 3/2022 | Jackson, II et al. |
| 2022/0094521 | A1 | 3/2022 | Moon et al. |

FOREIGN PATENT DOCUMENTS

| | | |
|---|---|---|
| KR | 102297536 B1 | 9/2021 |
| KR | 102304992 B1 | 9/2021 |
| KR | 10-2430495 B1 | 8/2022 |

OTHER PUBLICATIONS

Jung Hee Cheon, et al. "Efficient Homomorphic Comparison Methods with Optimal Complexity", Part of the Lecture Notes in Computer Science book series (LNCS, vol. 12492) Published Dec. 2020.

Sunwoong Kim, et al. "FPGA-based Accelerators of Fully Pipelined Modular Multipliers for Homomorphic Encryption", 2019 International Conference on ReConFigurable Computing and FPGAs (ReConFig).

1 Notice of Allowance for U.S. Appl. No. 17/739,512 dated Aug. 27, 2024.

* cited by examiner

DEVICE FOR SUPPORTING HOMOMORPHIC ENCRYPTION OPERATION AND OPERATING METHOD THEREOF

CROSS-REFERENCE TO RELATED APPLICATION(S)

This application claims the benefit under 35 USC 119(a) of Korean Patent Application Nos. 10-2021-0154972 filed on Nov. 11, 2021 and 10-2022-0014246 filed on Feb. 3, 2022 in the Korean Intellectual Property Office, the entire disclosures of each of which are incorporated herein by reference for all purposes.

BACKGROUND

Inventive concepts relate to a device for supporting a homomorphic encryption operation and/or an operating method thereof.

In general, homomorphic encryption may obtain a same result as an encrypted value obtained after performing an operation on plaintext, even when the operation is performed or directly performed on ciphertext obtained without decrypting encrypted information. The homomorphic encryption may thus perform various operations such as statistical processing and/or machine learning without decrypting the ciphertext, and may thus be a key technology in the spotlight of companies and/or individuals providing big data-based services. One homomorphic encryption technology, that may be close to commercialization, is fully homomorphic encryption technology which overcomes a limit on the number of operations by applying bootstrapping technology to leveled homomorphic encryption, which allows only a finite number of operations. A large problem in the commercialization of homomorphic encryption technology may be a size of the ciphertext increased by several orders of magnitude or several tens of times as compared to original data.

SUMMARY

Various example embodiments provide a device for supporting a homomorphic encryption operation using different operation processing and/or an operating method thereof.

According to some example embodiments, a homomorphic encryption operation device includes a ciphertext conversion circuit configured to convert first ciphertexts corresponding to a first operation size to second ciphertexts having a second operation size, different from the first operation size, and to convert the operated ciphertext having the second operation size to a third ciphertexts corresponding to the first operation size; and a homomorphic encryption operation circuit performing a homomorphic encryption operation on the second ciphertexts.

According to some example embodiments, an operating method of a server supporting a homomorphic encryption operation includes: receiving a request for the homomorphic encryption operation and first ciphertexts corresponding to a first operation size, the receiving from an internet of things (IoT) device; requesting a parameter used for the homomorphic encryption operation to IoT device; receiving the parameter from the IoT device; converting the first ciphertexts to second ciphertexts corresponding to a second operation size using the parameter; performing the homomorphic encryption operation on the second ciphertexts; and outputting the operated result to the IoT device.

According to some example embodiments, a storage device includes: at least one non-volatile memory device; and a controller configured to control the at least one non-volatile memory device. The controller includes at least one processor configured to control an overall operation; a buffer memory configured to temporarily store data used for the operation; and a security module configured to encrypt first data, based on a homomorphic encryption algorithm and decrypting encrypted second data, based on the homomorphic encryption algorithm, and when the homomorphic encryption operation is required or expected or desired, the security module generates a parameter indicating an operation size of a host device, and transmits the first data and the parameter to the host device.

According to some example embodiments, an operating method of a homomorphic encryption system includes: generating, by a homomorphic encryption device, a parameter indicating a first set of prime numbers to convert first ciphertext using a second set of prime numbers; and converting, by the homomorphic encryption operation device, the first ciphertext to second ciphertext using the parameter.

BRIEF DESCRIPTION OF DRAWINGS

The above and other aspects, features, and advantages of inventive concepts will be more clearly understood from the following detailed description, taken in conjunction with the accompanying drawings, in which.

DETAILED DESCRIPTION

Hereinafter, various example embodiments will be described with reference to the accompanying drawings.

Homomorphic encryption, which may be a fourth generation encryption technology, may obtain the same result as an encrypted value obtained after performing an operation in plaintext, even when the operation is performed on a ciphertext and is obtained without decrypting encrypted information. The homomorphic encryption may thus perform various operations such as statistical processing and/or machine learning without decrypting the ciphertext, thereby providing big data-based services. One of the homomorphic encryption technologies, which is close to commercialization, may be fully homomorphic encryption technology which overcomes a limit on the number of operations by applying bootstrapping technology to leveled homomorphic encryption which allows only a finite number of operations.

In the homomorphic encryption allowing an operation between ciphertexts, the ciphertext may have a size that is increased by several orders of magnitude, e.g. to several thousand bits in proportion to the number of multiplications between the ciphertexts. It may be advantageous to process the operation in a central processing unit (CPU) and/or a graphic processing unit (GPU) by dividing the ciphertext having the size of several thousand bits into 64-bit units. The Chinese remainder theorem (CRT) may be used to divide data of homomorphic encryption text into specific bit units and to process the same, because of the cryptographic safety and the mathematical limitation of the homomorphic encryption. In order to divide the homomorphic ciphertext into the specific bit units and process the same in parallel, an additional operation process may be used or required. The division may also affect a size of an error intentionally inserted in the homomorphic ciphertext to maintain the security. On the other hand, it may be possible to not apply various and complex algorithms required or used to divide the ciphertext when a device performing the operation on the homomorphic ciphertext is a field programmable gate array (FPGA) and/or an application specific integrated circuit (ASIC), which is designed to be suitable for performing the operation on a large ciphertext using bits larger than 64 bits for its operation processing unit.

A device for supporting a homomorphic encryption operation and/or an operating method thereof according to some example embodiments of inventive concepts may efficiently convert the operation processing unit of the ciphertext to enable a homomorphic encryption operation between devices using different operation processing units for different purposes, using the homomorphic encryption having the size of several thousand bits as its basic operation processing unit.

Hereinafter, the description describes a storage device supporting the homomorphic encryption operation according to some example embodiments of inventive concepts.

Figure 1:
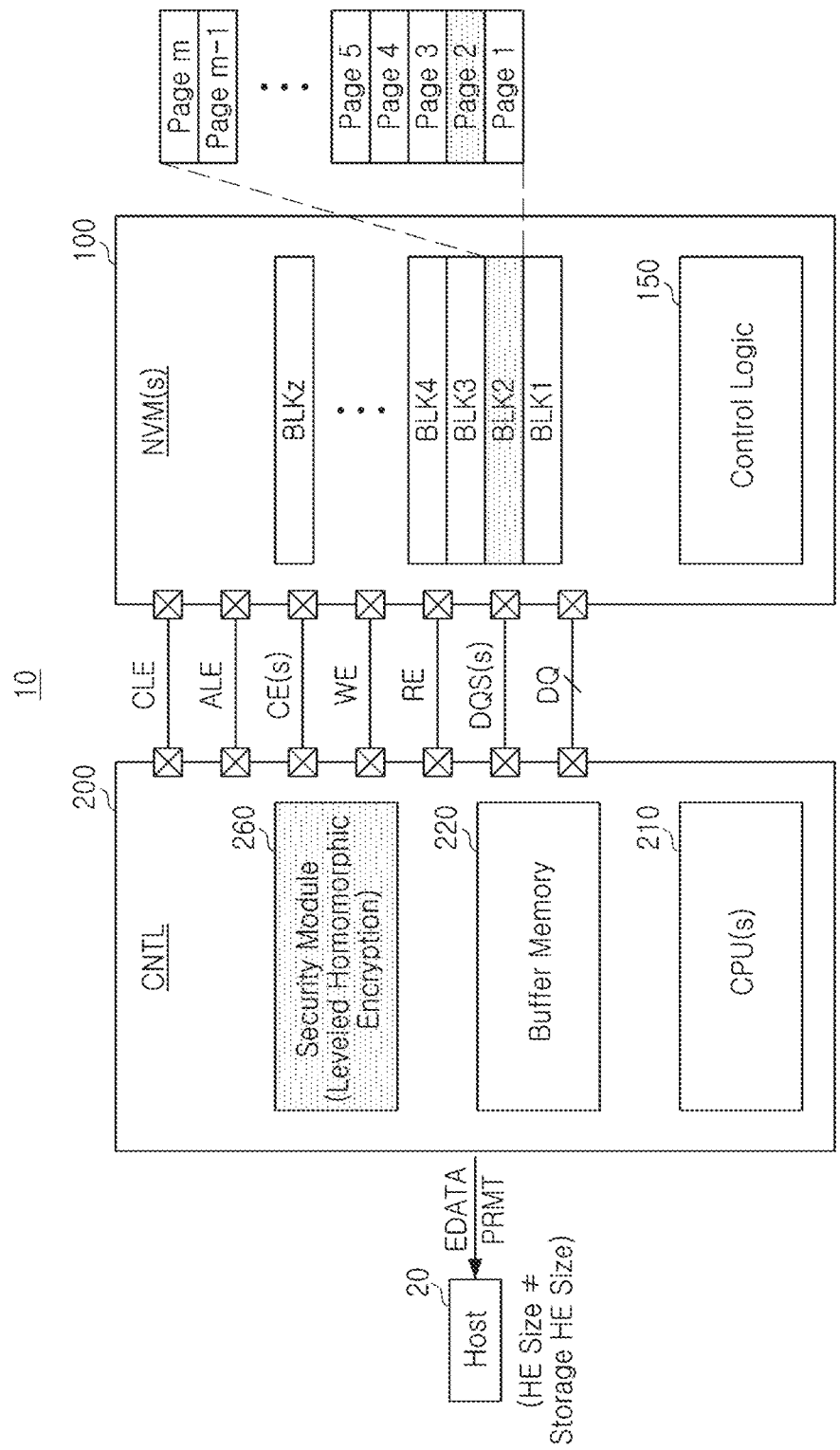
FIG. 1 is a view schematically illustrating a storage device according to some example embodiments of inventive concepts.

FIG. 1 is a view schematically illustrating a storage device 10 according to some example embodiments of inventive concepts. Referring to FIG. 1, the storage device 10 may include at least one non-volatile memory device (NVM(s)) 100 and a controller (CTRL) 200.

The at least one non-volatile memory device 100 may store data. The non-volatile memory device 100 may be or may include one or more of a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM) or the like. In addition, the non-volatile memory device 100 may have a three-dimensional array structure. Example embodiments may be applicable not only to a flash memory device in which a charge storage layer is formed of a conductive floating gate, but also to a charge trap flash (CTF) in which the charge storage layer is formed of an insulating film. Hereinafter, for convenience of explanation, the non-volatile memory device 100 is referred to as a vertical NAND flash memory device (VNAND).

The non-volatile memory device 100 may include a plurality of memory blocks BLK1 to BLKz (here, z is an integer greater than or equal to 2) and a control logic 150. Each of the plurality of memory blocks BLK1 to BLKz may include a plurality of pages Page 1 to Page m (here, m is an integer greater than or equal to 2). Each of the plurality of pages Page 1 to Page m may include a plurality of memory cells. Each of the plurality of memory cells may store one or more bits, e.g. may be a single-level cell (SLC) and/or a multi-level cell (MLC).

The control logic 150 may receive a command and an address from the controller 200 and perform an operation (e.g., one or more of program operation, read operation or erase operation) corresponding to the received command on the memory cells corresponding to the address.

The controller 200 may be connected to at least one non-volatile memory device 100 through a plurality of control pins that transmit control signals (e.g., one or more of CLE, ALE, CE(s), WE and RE). In addition, the controller may control the non-volatile memory device 100 using the control signals (e.g., one or more of CLE, ALE, CE(s), WE and RE). For example, the non-volatile memory device 100 may perform one or more of the program operation/the read operation/the erase operation by latching the command or the address at an edge of the write enable (WE)/read enable (RE) signal according to the command latch enable (CLE) signal and the address latch enable (ALE) signal. For example, the chip enable (CE) signal may be activated during the read operation, the command latch enable (CLE) signal may be activated during a command transmission, the address latch enable (ALE) signal may be activated during an address transmission, and the read enable (RE) signal may be toggled while data is transmitted through a data signal line (DQ). A data strobe signal (DQS) may be toggled with a frequency corresponding to a data input/output speed.

The controller 200 may include at least one processor (central processing unit (s)) 210, a buffer memory 220 and a security module 260.

The processor 210 may control an overall operation of the storage device 10. The processor 210 may perform various management operations such as one or more of a cache/buffer management, a firmware management, a garbage collection management, a wear leveling management, a duplicate data removal management, a read refresh/reclaim management, a bad block management, a multi-stream management, mapping managements of host data and non-volatile memory, a quality of service (QoS) management, a system resource allocation management, a non-volatile memory queue management, a read level management, an erase/program management, a hot/cold data management, a power loss protection management, a dynamic thermal management, an initialization management and a redundant arrays of inexpensive disk (RAID) management.

A buffer memory 220 may be or may include a volatile memory (e.g., one or more of static random access memory (SRAM), dynamic RAM (DRAM), synchronous RAM (SDRAM)), and/or may be or may include a non-volatile memory (e.g., one or more of flash memory, phase-change RAM (PRAM), magneto-resistive RAM (MRAM), resistive RAM (ReRAM) or ferro-electric RAM (FRAM)).

The security module 260 may perform a security function of the storage device 10. For example, the security module 260 may perform a self-encryption disk (SED) function and/or a trusted computing group (TCG) security function. The SED function may store encrypted data in the non-volatile memory device 100 or decrypt the encrypted data from the non-volatile memory device 100 using an encryption algorithm or decrypt the encrypted data from the non-volatile memory device 100. This encryption/decryption operation may be performed using an internally-generated encryption key. In some example embodiments, the encryption algorithm may be an advanced encryption standard (AES) encryption algorithm; however, example embodiments are not limited thereto. The TCG security function may provide a mechanism that enables access control to the user data of the storage device 10. For example, the TCG security function may perform an authentication procedure between an external device and the storage device 10. In some example embodiments, the SED function or the TCG security function may be optionally selectable.

The security module 260 may generate the ciphertext based on a leveled homomorphic encryption algorithm, may convert the generated ciphertext to a plurality of ciphertexts which use a first set of prime numbers corresponding to a first operation size, by using the Chinese remainder theorem, and may generate a parameter indicating a second set of prime numbers corresponding to a second operation size. The security module 260 may receive the ciphertexts operated from the host device, may convert the received ciphertexts to another converted ciphertext by inversely operating the Chinese remainder theorem, and may decrypt the converted ciphertext based on the leveled homomorphic encryption algorithm.

The storage device 10 according to some example embodiments of inventive concepts may perform the homomorphic encryption operation with the host device performing operations of different operation sizes.

Figure 2:
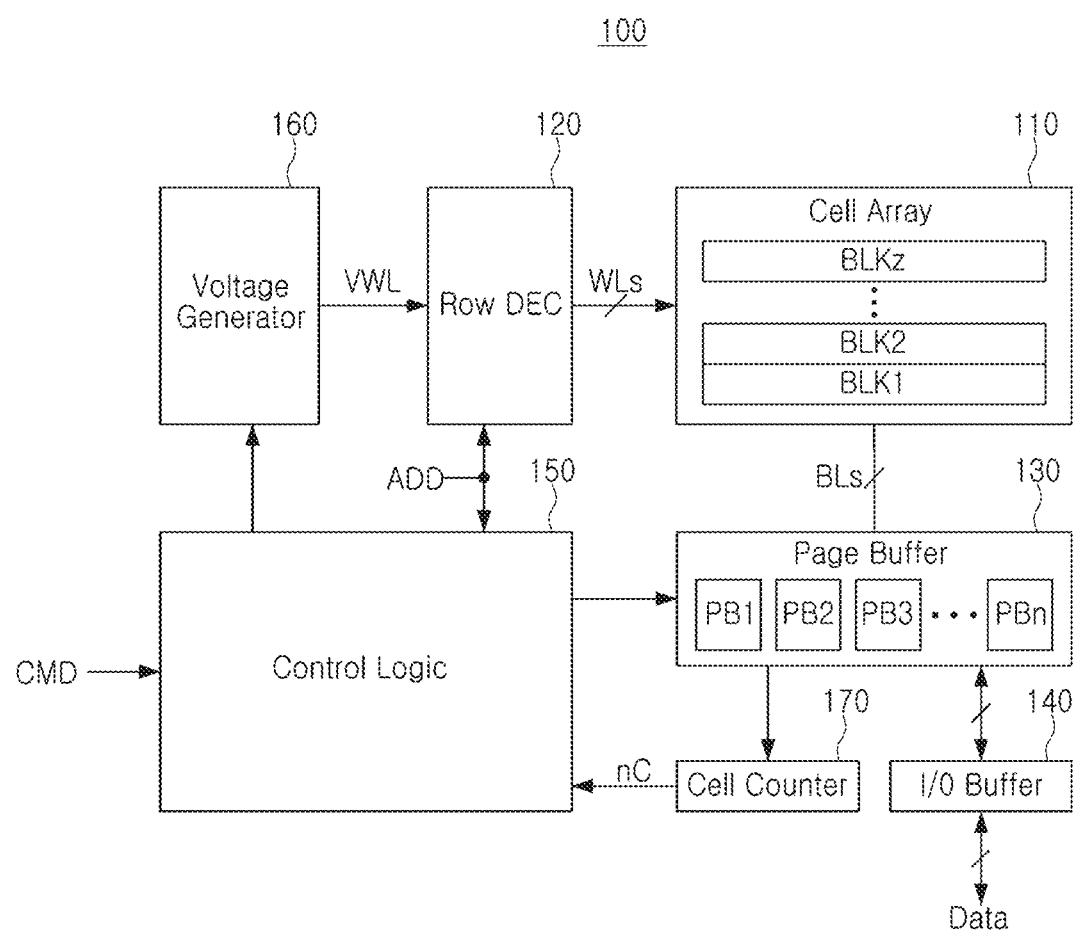
FIG. 2 is a view schematically illustrating a non-volatile memory device illustrated in FIG. 1.

FIG. 2 is a view schematically illustrating the non-volatile memory device 100 illustrated in FIG. 1. Referring to FIG. 2, the non-volatile memory device 100 may include a memory cell array 110, a row decoder 120, a page buffer circuit 130, an input/output buffer circuit 140, a control logic 150, a voltage generator 160 and a cell counter 170.

The memory cell array 110 may be connected to the row decoder 120 through word lines (WLs) and/or selection lines (SSL, GSL). The memory cell array 110 may be connected to the page buffer circuit 130 through bit lines BLs. The memory cell array 110 may include a plurality of cell strings. Each channel of the cell strings may be formed in a vertical or horizontal direction. Each of the cell strings may include the plurality of memory cells. Here, the plurality of memory cells may be programmed, erased and/or read by a voltage applied to the bit line BLs or the word line WLs. In general, the program operation may be performed in units of pages, and the erase operation may be performed in units of blocks. Details of the memory cells are described in US Patent Nos. U.S. Pat. Nos. 7,679,133, 8,553,466, 8,654,587, 8,559,235 and 9,536,970, the entire contents of each of which are herein incorporated by reference. In some example embodiments, the memory cell array 110 may include a two-dimensional memory cell array, and the two-dimensional memory cell array may include a plurality of NAND strings disposed in a row direction and a column direction.

The row decoder 120 may select any one or more of the memory blocks BLK1 to BLKz of the memory cell array 110 in response to an address ADD. The row decoder 120 may select any one or more of the word lines of the selected memory block in response to the address ADD. The row decoder 120 may transmit a word line voltage VWL corresponding to an operation mode to the word line of the selected memory block. During the program operation, the row decoder 120 may apply a program voltage and/or a verify voltage to the selected word line, and may apply a pass voltage to an unselected word line. During the read operation, the row decoder 120 may apply a read voltage to the selected word line and a read pass voltage to the unselected word line.

The page buffer circuit 130 may be operated as a write driver and/or a sense amplifier. During the program operation, the page buffer circuit 130 may apply a bit line voltage corresponding to data to be programmed to the bit lines of the memory cell array 110. During the read operation or a verify read operation, the page buffer circuit 130 may sense data stored in the selected memory cell through the bit line BL. Each of the plurality of page buffers PB1 to PBn (here, n is an integer greater than or equal to 2) included in the page buffer circuit 130 may be connected to at least one bit line.

Each of the plurality of page buffers PB1 to PBn may perform the sensing and latching for performing an Open vSwitch (OVS) operation. For example, each of the plurality of page buffers PB1 to PBn may perform a plurality of sensing operations to identify a state of any one data stored in the selected memory cells under control of the control logic 150. Alternatively or additionally, each of the plurality of page buffers PB1 to PBn may store data sensed through the plurality of sensing operations, and then select any one data under the control of the control logic 150. For example, each of the plurality of page buffers PB1 to PBn may perform the plurality of sensing operations to identify the state of any one data. Alternatively or additionally, each of the plurality of page buffers PB1 to PBn may select and/or output improved or optimal data from the plurality of data sensed under the control of the control logic 150.

The input/output buffer circuit 140 may provide externally-provided data to the page buffer circuit 130. The input/output buffer circuit 140 may provide an externally-provided command CMD to the control logic 150. The input/output buffer circuit 140 may provide an externally-provided address ADD to the control logic 150 or the row decoder 120. Alternatively or additionally, the input/output buffer circuit 140 may externally output data sensed and latched by the page buffer circuit 130.

The control logic 150 may control the row decoder 120 and the page buffer circuit 130 in response to the command CMD externally transmitted (e.g., from the controller 200 (refer to FIG. 1)).

The voltage generator 160 may generate various types of word line voltages to be applied to the respective word lines under the control of the control logic 150, and may also generate a well voltage to be supplied to a bulk (e.g., well region) in which the memory cells are formed. The word line voltages applied to the respective word lines may include the program voltage, the pass voltage, the read voltage and the read pass voltage.

The cell counter 170 may count the memory cells corresponding to a specific threshold voltage range from data sensed by the page buffer circuit 130. For example, the cell counter 170 may process the data sensed by each of the plurality of page buffers PB1 to PBn, thereby counting the number of memory cells each having a threshold voltage in the specific threshold voltage range.

Figure 3:
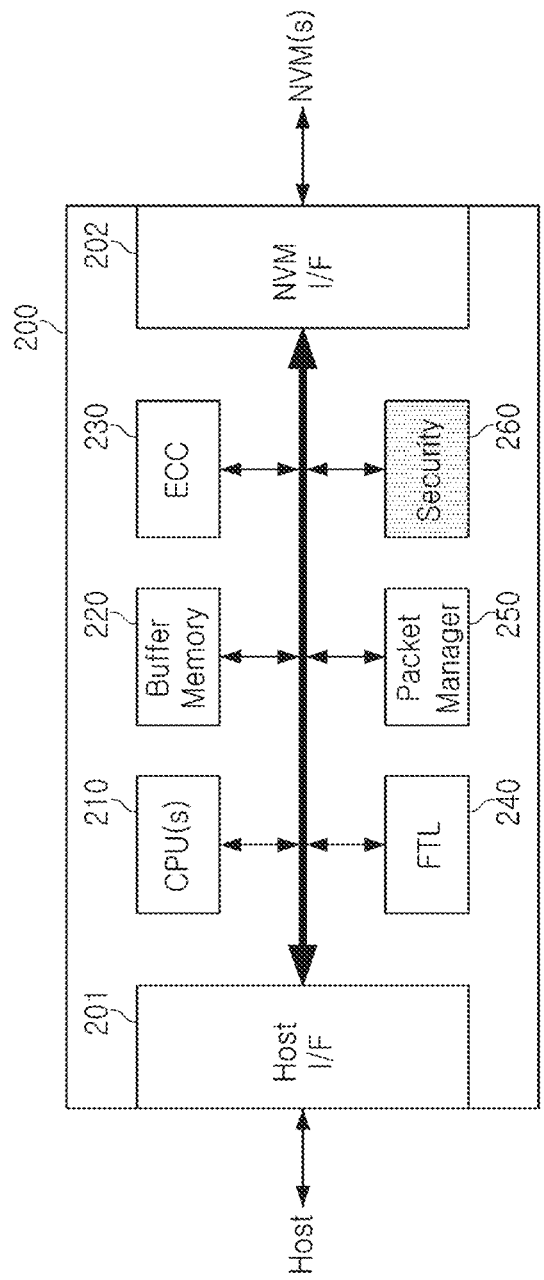
FIG. 3 is a view schematically illustrating a controller according to some example embodiments of inventive concepts.

FIG. 3 is a view schematically illustrating the controller 200 according to some example embodiments of inventive concepts. Referring to FIG. 3, the controller 200 may include a host interface 201, a memory interface 202, the at least one CPU 210, the buffer memory 220, an error correction circuit 230, and a flash conversion layer manager 240, a packet manager 250 and the security module 260.

The host interface 201 may transmit and receive a packet to and from the host. The packet transmitted from the host to the host interface 201 may include a command or data to be written to the non-volatile memory device 100. The packet transmitted from the host interface 201 to the host may include a response to the command or data read from the non-volatile memory device 100. The memory interface 202 may transmit the data to be written to the non-volatile memory device 100 to the non-volatile memory device 100 or may receive the data read from the non-volatile memory device 100. The memory interface 202 may be implemented to comply with a standard protocol such as JEDEC Toggle and/or Open NAND flash Interface (ONFI).

The buffer memory 220 may temporarily store the data to be written to the non-volatile memory device 100 or the data read from the non-volatile memory device 100. In some example embodiments, all or at least a portion of the buffer memory 220 may be a component disposed in or included in the controller 200. In other some example embodiments, all or at least a portion of the buffer memory 220 may be disposed outside the controller 200.

An error correction code (ECC) circuit 230 may generate an error correction code during the program operation and recover data using the error correction code during the read operation. For example, the ECC circuit 230 may generate an error correction code (ECC) for correcting a fail bit or an error bit of the data received from the non-volatile memory device 100. The ECC circuit 230 may perform an error correction encoding on the data provided to the non-volatile memory device 100, thereby forming data to which a parity bit is added. The parity bit may be stored in the non-volatile memory device 100.

Alternatively or additionally, the ECC circuit 230 may perform an error correction decoding on the data output from the non-volatile memory device 100. The ECC circuit 230 may correct an error using the parity. The ECC circuit 230 may correct the error using a coded modulation such as one or more of a low density parity check (LDPC) code, a Bose-Chaudhuri-Hocquenghem (BCH) code, a turbo code, a Reed-Solomon code, a convolution code, a recursive systematic code (RSC), a trellis-coded modulation (TCM) or a block coded modulation (BCM). Meanwhile, a read retry operation may be performed when the error correction circuit 230 is unable to perform an error correction.

The flash conversion layer manager 240 may perform various functions such as one or more of address mapping, wear-leveling and garbage collection. The address mapping operation may be an operation of changing a logical address received from the host into a physical address used to actually store data in the non-volatile memory device 100. The wear-leveling may be a technique for preventing excessive degradation of a specific block by ensuring that the blocks in the non-volatile memory device 100 are uniformly used. For example, the wear-leveling may be implemented by a firmware technique in which erase counts of physical blocks are balanced. The garbage collection may be a technique for securing capacity usable in the non-volatile memory device 100 by copying valid data of the block to a new block and then erasing the existing block.

The packet manager 250 may generate the packet according to a protocol of an interface negotiated with the host, and/or may parse various types of information from the packet received from the host.

The security module 260 may perform at least one of the encryption operation and the decryption operation on data input to the CPU 210 using a symmetric-key algorithm. The security module 260 may include an encryption module and a decryption module. In some example embodiments, the security module 260 may be implemented in one or more of hardware/software/firmware. In addition, the security module 260 may perform an authentication operation with the external device or perform a fully homomorphic encryption technology function.

In general, when using the homomorphic encryption, a user having a device with low operational capability may entrust or offload a complex operation on data held by the user to a server having a device with high operation capability, without simultaneously disclosing user information transmitted to the server. A general user may generate the homomorphic ciphertext by having a user device select a prime suitable for the CPU and/or GPU having a 64-bit operation processing unit. On the other hand, the server may use an ASIC and/or FPGA-based homomorphic encryption hardware acceleration device that uses bits larger than 64 bits for its operation processing unit to process the homomorphic encryption operation at a high speed. Therefore, a technique and/or a device may be needed or desired to support the user device and the server, as they may use different operation processing units.

Ring learning with errors (RLWE)-based homomorphic encryption technology may allow the ciphertext to have a size increased to several tens of size compared to original data or plaintext data for the operation between the ciphertexts.

Figure 4:
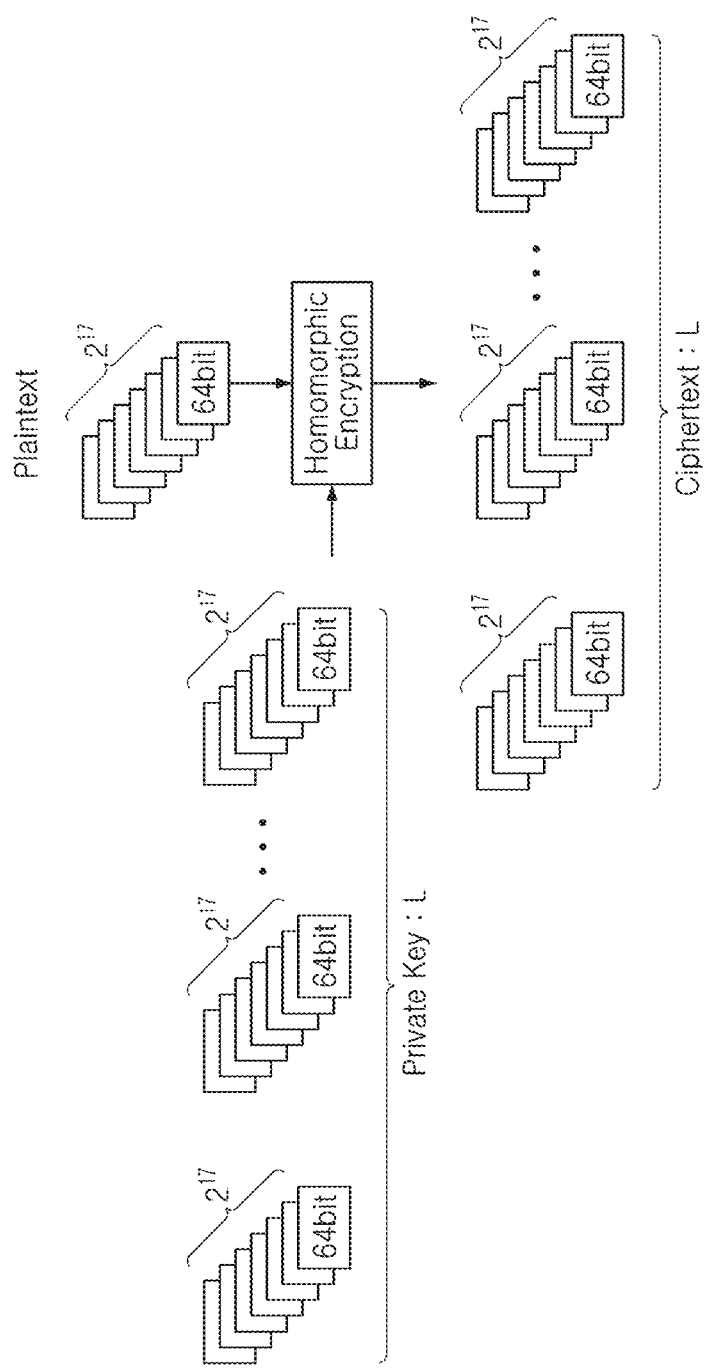
FIG. 4 is a view comparing sizes of input data and output data in general homomorphic encryption technology.

FIG. 4 is a view comparing sizes of the input and output data in general homomorphic encryption technology. Referring to FIG. 4, original data having several tens of bits may be converted to the ciphertext having a size of several thousand bits.

In general, the homomorphic encryption may be or may include an encryption system in which an output ciphertext has a size increased by several orders of magnitude, e.g. to several tens of size compared to the input original data or the input plaintext, and may be different from an existing encryption technology. The homomorphic encryption may increase the ciphertext L times compared to the original data (e.g. plaintext) to perform L (here, L is an integer greater than or equal to 2) multiplications on the encrypted data. This technical characteristic may be an inherent theoretical characteristic of the homomorphic encryption technology. Therefore, an existing homomorphic encryption data transmission method may need to or may significantly increase the data transmission amount in order to increase the number of possible operations when transmitting and receiving the ciphertext. Therefore, in order to reduce an amount of operations generated when the operation is performed on data having the size of several thousand bits, example embodiments may use a method of dividing the data into a size of several tens of bits, and performing parallel processing the divided data.

Figure 5:
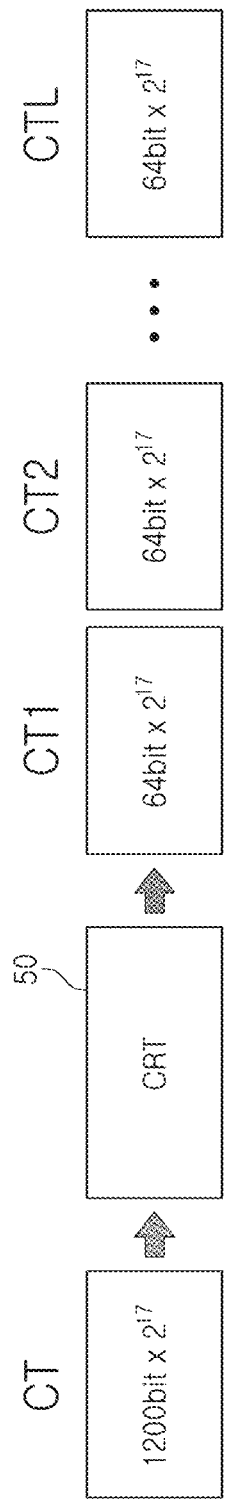
FIG. 5 is a view schematically illustrating a parallelization processing technique of a general ciphertext.

FIG. 5 is a view schematically illustrating a parallelization processing technique of a general ciphertext according to some example embodiments. Referring to FIG. 5, the Chinese remainder theorem (CRT) may be used in order to divide the data having the size of several thousand bits into data having a smaller size, while maintaining security of the data in the homomorphic encryption. The ciphertext may be indicated as a residue number system (RNS) using the CRT. In general, RNS-based homomorphic encryption may indicate the data having the size of several thousand bits as remainders of the primes, which are coprimes in each pair. In addition, the operation processing unit may be determined by a bit size of the prime or number of bits of the prime or the ceiling of the base-2 logarithm of the prime to be used. Therefore, according to some example embodiments, when processing the homomorphic ciphertext by the CPU or GPU that processes data in 64-bit units, primes each having a size close to a 64-bit size may be used to use the residue number system (RNS). On the other hand, the ASIC/FPGA designed for processing the homomorphic encryption operation may use an operation processing unit larger than the 64-bit operation processing unit for high-speed data processing.

Figure 6:
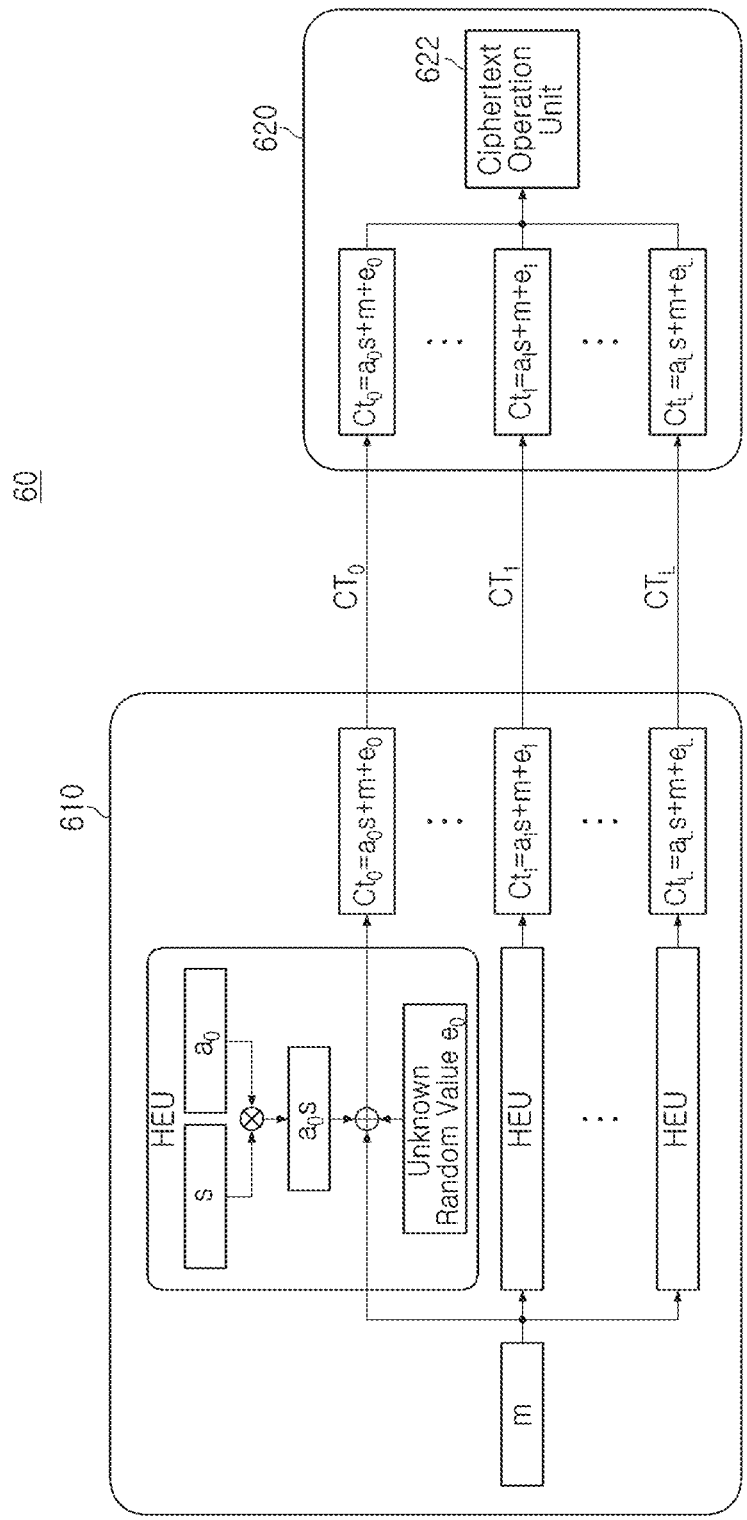
FIG. 6 is a view schematically illustrating a general server system.

FIG. 6 is a view schematically illustrating a general server system 60. Referring to FIG. 6, the server system 60 may include a user device 610 and a server 620. It may be assumed that the server system 60 illustrated in FIG. 6 applies a RNS technique to Cheon-Kim-Kim-Song (CKKS) scheme. The user device 610 performing the homomorphic encryption on original data m may consider an environment for using the CPU or GPU that generally uses the 64-bit operation processing unit.

Message: $m < 64$ bit

Public key: $a_i < 64$ bit

Private key: $s < 64$ bit

Unknown Random value: $e_i$~discrete Gaussian distribution $(0,\sigma)$ [Equation 1]

The ciphertext indicated in the RNS may indicate data by first set primes. In order to convert the prime to be used, the date may return to initially set data having the large bit units by performing the inverse operation of the CRT, and then converted to the RNS using the CRT again.

As illustrated in FIG. 6, the homomorphic encryption technology according to some example embodiments may enable the complex operation on sensitive information held by an individual to be processed in the server 620, without or with reduced likelihood of leakage of personal information. Considering this technical background, an amount of the operation that the server 620 may support for the homomorphic encryption may be relatively larger than that of the user device 610. The basic operation unit provided by the device may be different depending on suitability of the server system 60.

The device for supporting a homomorphic encryption operation and the operating method thereof according to some example embodiments of inventive concepts may enable or improve or make more streamlined inter-operation between the devices having different operation processing units.

Figure 7:
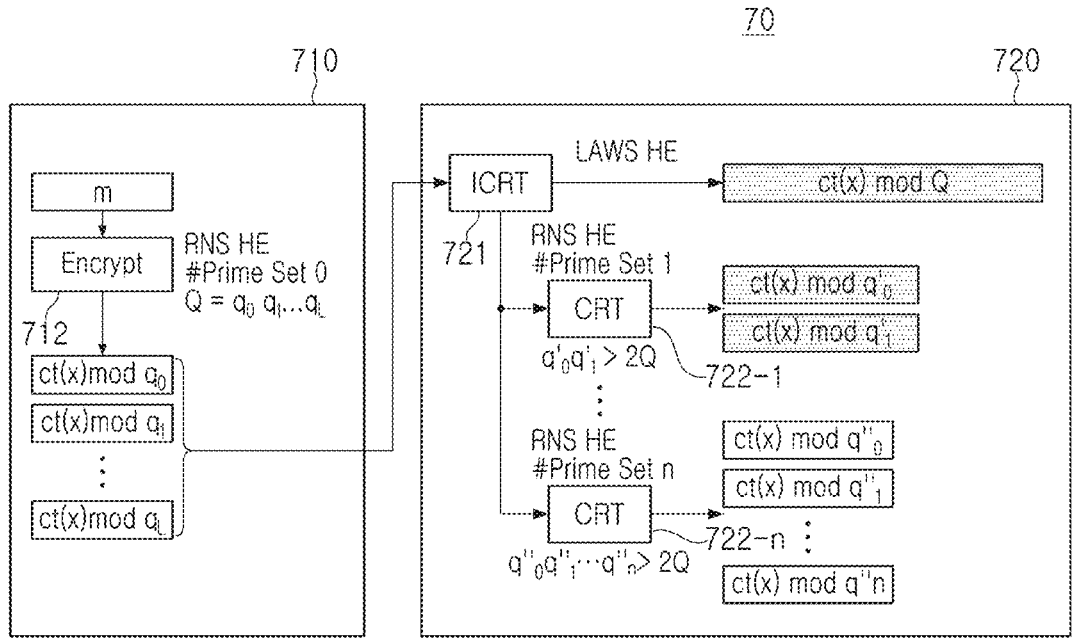
FIG. 7 is a view schematically illustrating an encryption process of a server system 70 according to some example embodiments of inventive concepts.

FIG. 7 is a view schematically illustrating an encryption process of a server system 70 according to some example embodiments of inventive concepts. Here, a user device 710 may use the 64-bit operation processing unit of the CPU/GPU. A server 720 may use a large arithmetic word size (LAWS) such as FPGA or ASIC.

The user device 710 may transmit the ciphertext using an appropriate prime of less than 64 bits. The user device 710 may include an encryption unit 712. The encryption unit 712 may receive the original data m, generate a ciphertext $ct(x)$ mod Q using the homomorphic encryption algorithm, and generate a plurality of ciphertexts $ct(x)$ mod $q_0$, $ct(x)$ mod $q_1$, ... and $ct(x)$ mod $q_L$ using residue number system homomorphic encryption (RNS HE) corresponding to the ciphertext $ct(x)$ mod Q. Here, the plurality of ciphertexts $ct(x)$ mod $q_0$, $ct(x)$ mod $q_1$, ... and $ct(x)$ mod $q_L$ may use respective values corresponding to a set of primes $q_0$, $q_1$, ... and $q_L$ used in the CRT. Here, the modulus Q may be a value $(Q=q_0 q_1 \ldots q_L)$ obtained by multiplying the primes $q_0, q_1, \ldots$ and $q_L$. Each of the primes $q_0, q_1, \ldots$ and $q_L$ is coprime.

The server 720 may receive the plurality of ciphertexts $ct(x)$ mod $q_0$, $ct(x)$ mod $q_1$, ... and $ct(x)$ mod $q_L$ from the user device 710, may reset the prime $q'>64$ bits indicating each of the ciphertexts to a size suitable for the operation to be performed, and convert the ciphertexts.

The server 720 may include a ciphertext integration ICRT circuit 721 and a plurality of ciphertext division circuits CRT 722-1, ... and 722-n (here, n is an integer greater than or equal to 2 and L is a different integer).

The ciphertext integration ICRT circuit 721 may receive the plurality of ciphertexts $ct(x)$ mod $q_0$, $ct(x)$ mod $q_1$, ... and $ct(x)$ mod $q_L$, and may output the original ciphertext $ct(x)$ mod Q by inversely operating the Chinese remainder theorem.

Each of plurality of ciphertext division circuits CRT 722-1, ... and 722-n may convert the original ciphertext $ct(x)$ mod Q to the plurality of ciphertexts using the CRT.

The first CRT circuit 722-1 may receive the original ciphertext $ct(x)$ mod Q, and may output ciphertexts $ct(x)$ mod $q'_0$ and $ct(x)$ mod $q'_1$ which use the first set of primes obtained using the Chinese remainder theorem. Here, the first set of primes may include two primes $q'_0$ and $q'_1$, where the product $q'_0 q'_1 > 2Q$. Similarly, the n-th CRT circuit 722-n may receive the original ciphertext $ct(x)$ mod Q, and may output ciphertexts $ct(x)$ mod $q''_0$, $ct(x)$ mod $q''_1$, ... and $ct(x)$ mod $q''_n$ which use the n-th set of primes obtained using the Chinese remainder theorem. Here, the n-th set of primes may include n primes $q''_0, q''_1, \ldots$ and $q''_n$, where the product $q''_0 q''_1 \ldots q''_n > 2Q$.

As illustrated in FIG. 7, the user device 710 and the server 720 may have different operation units of the homomorphic encryption, and thus have a different number of the ciphertexts generated by the Chinese remainder theorem, even though having the same ciphertext as each other. For example, the user device 710 may output L+1 ciphertexts corresponding to the same ciphertext, and the server 720 may output n+1 ciphertexts corresponding to the same ciphertext. Here, n is a value different from L.

Figure 8:
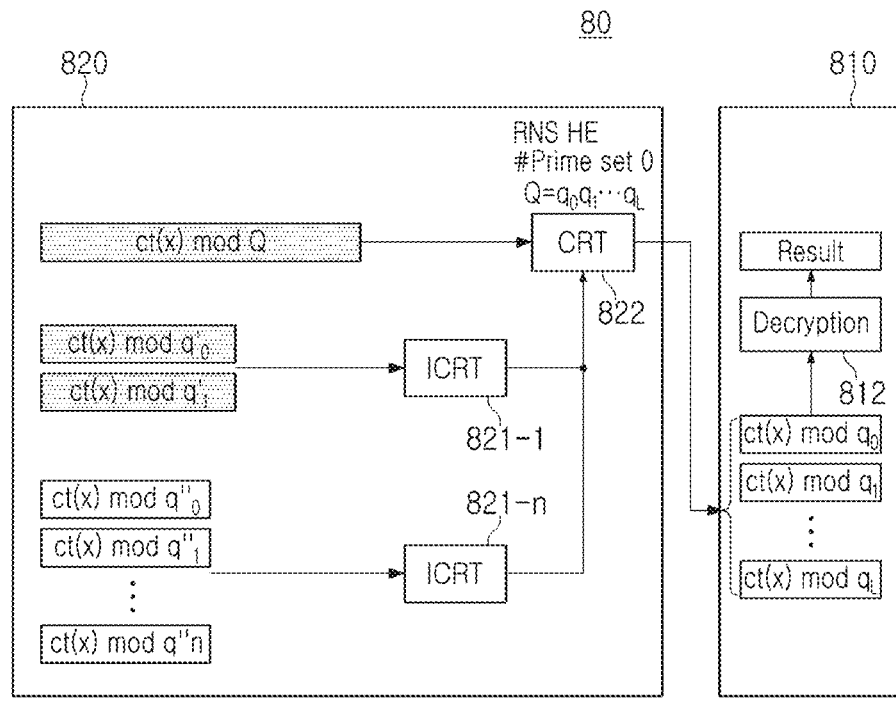
FIG. 8 is a view illustrating a decryption process of a server system according to some example embodiments of inventive concepts.

FIG. 8 is a view illustrating a decryption process of a server system 80 according to some example embodiments. Referring to FIG. 8, the decryption process of the server system 80 may be or may include a process performed inversely to the encryption process of the server system 70 illustrated in FIG. 7.

As illustrated in FIG. 8, when transmitting a result of performing the encryption operation to the user device 810, the server 820 may convert the ciphertext to a prime used by the user device 810 and then transmit the converted ciphertext.

The server 820 may include a plurality of ICRT circuits 821-1, . . . and 821-*n* and a CRT circuit 822. Each of the plurality of ICRT circuits 821-1, . . . and 821-*n* may receive ciphertexts corresponding to a corresponding source set and generate the original ciphertext ct(x) mod Q by inversely operating the Chinese remainder theorem. The CRT circuit 822 may receive the original ciphertext ct(x) mod Q, and may generate the plurality of ciphertexts ct(x) mod $q_0$, ct(x) mod $q_1$, . . . and ct(x) mod $q_L$ using the Chinese remainder theorem. Here, the plurality of ciphertexts ct(x) mod $q_0$, ct(x) mod $q_1$, . . . and ct(x) mod $q_L$ may be output to the user device 810.

The user device 810 may receive the plurality of ciphertexts ct(x) mod $q_0$, ct(x) mod $q_1$, . . . and ct(x) mod $q_L$ from the server 820, and may decrypt an operation result value corresponding to the plurality of ciphertexts ct(x) mod $q_0$, ct(x) mod $q_1$, . . . and ct(x) mod $q_L$, based on the homomorphic encryption algorithm. The user device 810 may include a decryption unit 812. The decryption unit 812 may receive the plurality of ciphertexts ct(x) mod $q_0$, ct(x) mod $q_1$, . . . and ct(x) mod $q_L$, and perform the decryption operation using residue number system homomorphic encryption (RNS HE).

Figure 9:
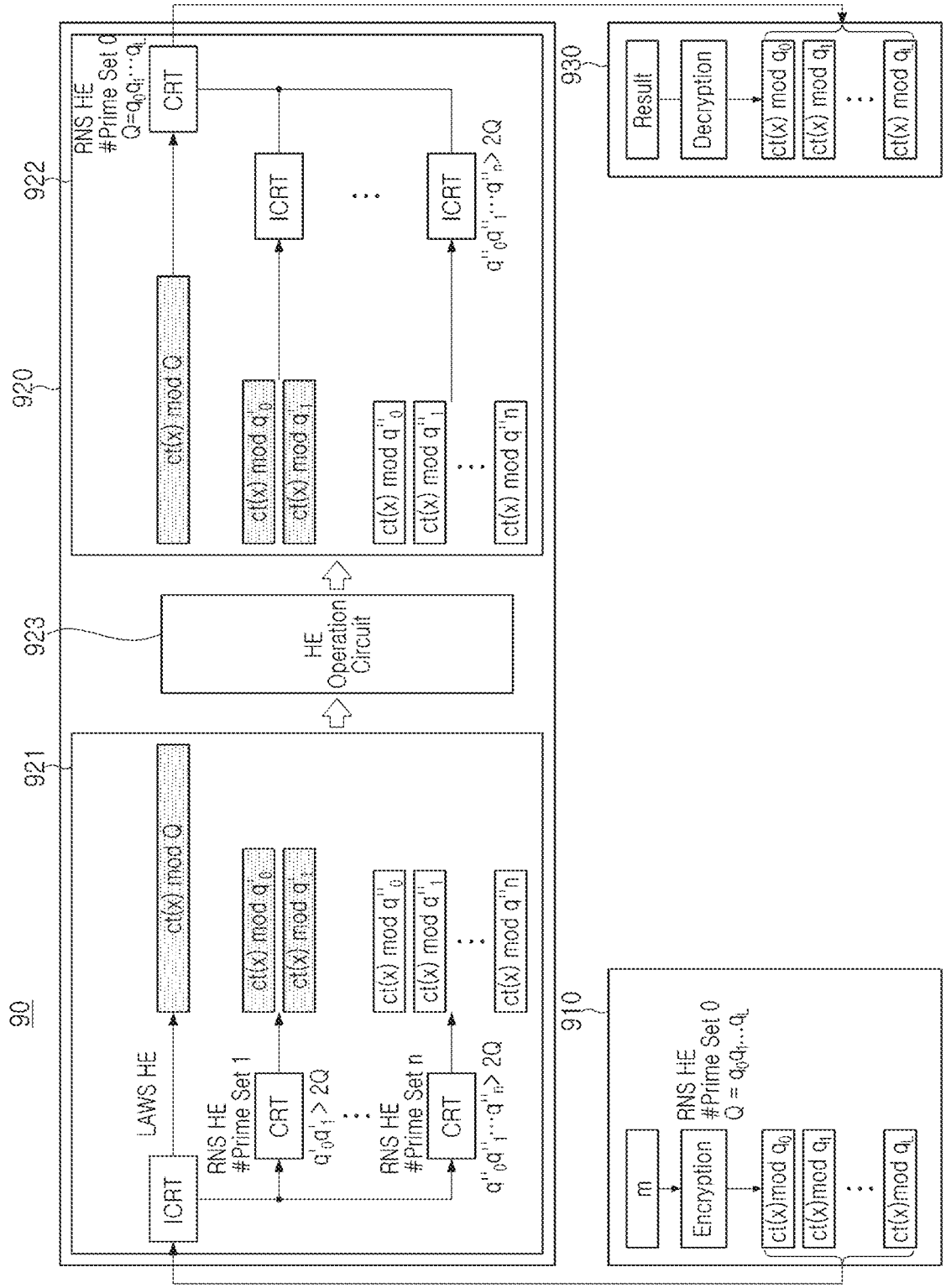
FIG. 9 is a view schematically illustrating an encryption operation device according to some example embodiments of inventive concepts.

FIG. 9 is a view schematically illustrating an encryption operation device 920 according to some example embodiments. Referring to FIG. 9, the encryption operation device 920 may include a first ciphertext conversion circuit 921, a second ciphertext conversion circuit 922 and an encryption operation circuit 923.

The first ciphertext conversion circuit 921 may convert the ciphertexts ct(x) mod $q_0$, ct(x) mod $q_1$, . . . and ct(x) mod $q_L$ which use the first set of prime numbers, which are obtained using the Chinese remainder theorem, into the ciphertexts which use the second set of primes, which are obtained using the Chinese remainder theorem. Here, the ciphertexts ct(x) mod $q_0$, ct(x) mod $q_1$, . . . and ct(x) mod $q_L$ which use the first set of primes, which are obtained using the Chinese remainder theorem, and the second prime set may be received from an encryption device 910. Here, the encryption device 910 and its operation may be the same as the user device 710 and its operation illustrated in FIG. 7. In some example embodiments, the first ciphertext conversion circuit 921 and the operations performed may be the same as the server 720 and the operations performed illustrated in FIG. 7.

The second ciphertext conversion circuit 922 may convert at least one ciphertext which uses the second set of primes, which is obtained using the Chinese remainder theorem, to the ciphertexts which use the first set of primes, which are obtained using the Chinese remainder theorem. Here, the ciphertexts may use the second set of primes, which are obtained using the Chinese remainder theorem, may have values output from the encryption operation circuit 923. In some example embodiments, the second ciphertext conversion circuit 922 and its operation may be the same as the server 820 and its operation illustrated in FIG. 8. In addition, the ciphertexts converted to have the first set of primes using the Chinese remainder theorem may be output to a decryption device 930. Here, the decryption device 930 and its operation may be the same as the user device 810 and its operation illustrated in FIG. 8.

The encryption operation circuit 923 may perform the operation on the ciphertexts output from the first ciphertext conversion circuit 921. In addition, the encryption operation circuit 923 may output at least one operated ciphertext to the second ciphertext conversion circuit 922.

A homomorphic encryption device 90 according to some example embodiments of inventive concepts may efficiently convert the encryption operation processing unit to enable the homomorphic encryption operation between the devices 910, 920 and 930, using different operation processing units for different purposes, using the homomorphic encryption having the size of several thousand bits as its basic operation processing unit.

Figure 10:
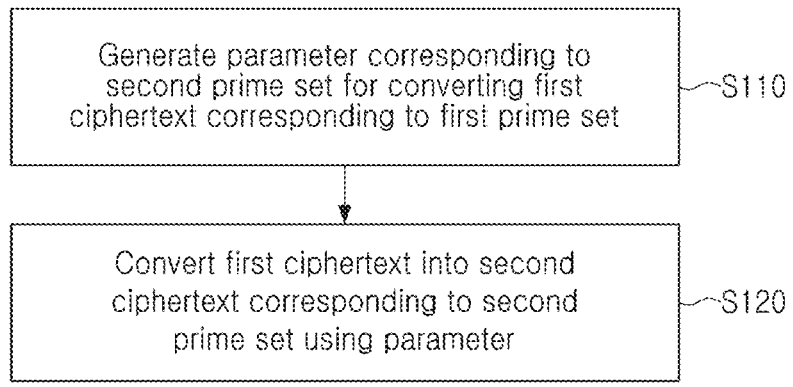
FIG. 10 is a flowchart schematically illustrating an operating method of a homomorphic encryption system according to some example embodiments of inventive concepts.

FIG. 10 is a flowchart schematically illustrating an operating method of a homomorphic encryption system according to some example embodiments of inventive concepts. Referring to FIG. 10, the homomorphic encryption device may be operated as follows. The homomorphic encryption device may generate the parameter indicating the second set of primes to convert the first ciphertext which uses the first set of primes (S110). The homomorphic encryption operation device may convert the first ciphertext into the second ciphertext which uses the second set of primes using the parameter (S120).

Figure 11:
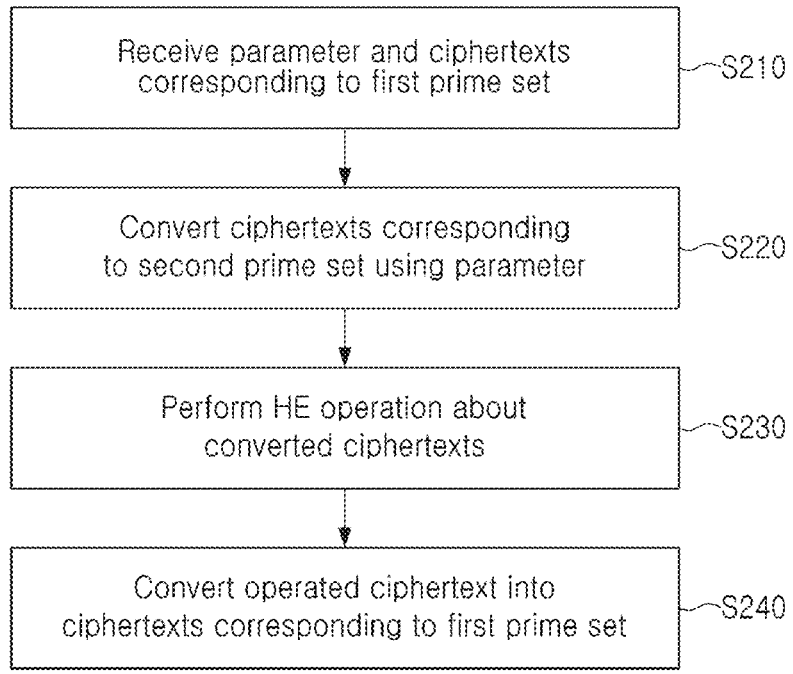
FIG. 11 is a flowchart illustrating an operating method of a server according to some example embodiments of inventive concepts.

FIG. 11 is a flowchart illustrating an operating method of the server according to some example embodiments of inventive concepts. Referring to FIG. 11, the server may perform the homomorphic encryption operation as follows.

The server may receive the parameter and ciphertexts from the user device (S210). Here, the ciphertexts may be the ciphertexts which use the first set of primes, which are obtained using the Chinese remainder theorem. In addition, the parameter may indicate the second set of primes.

The server may convert the received ciphertexts into the ciphertexts which uses the second set of primes using the received parameter (S220). Here, the converted ciphertexts may be the ciphertexts which use the second set of primes, which are obtained using the Chinese remainder theorem.

The server may perform the homomorphic encryption operation on the converted ciphertexts based on a request of the user device (S230). The server may then convert the operated ciphertext into the ciphertexts which use the first set of primes (S240). The converted ciphertexts may then be output to the user device.

Figure 12:
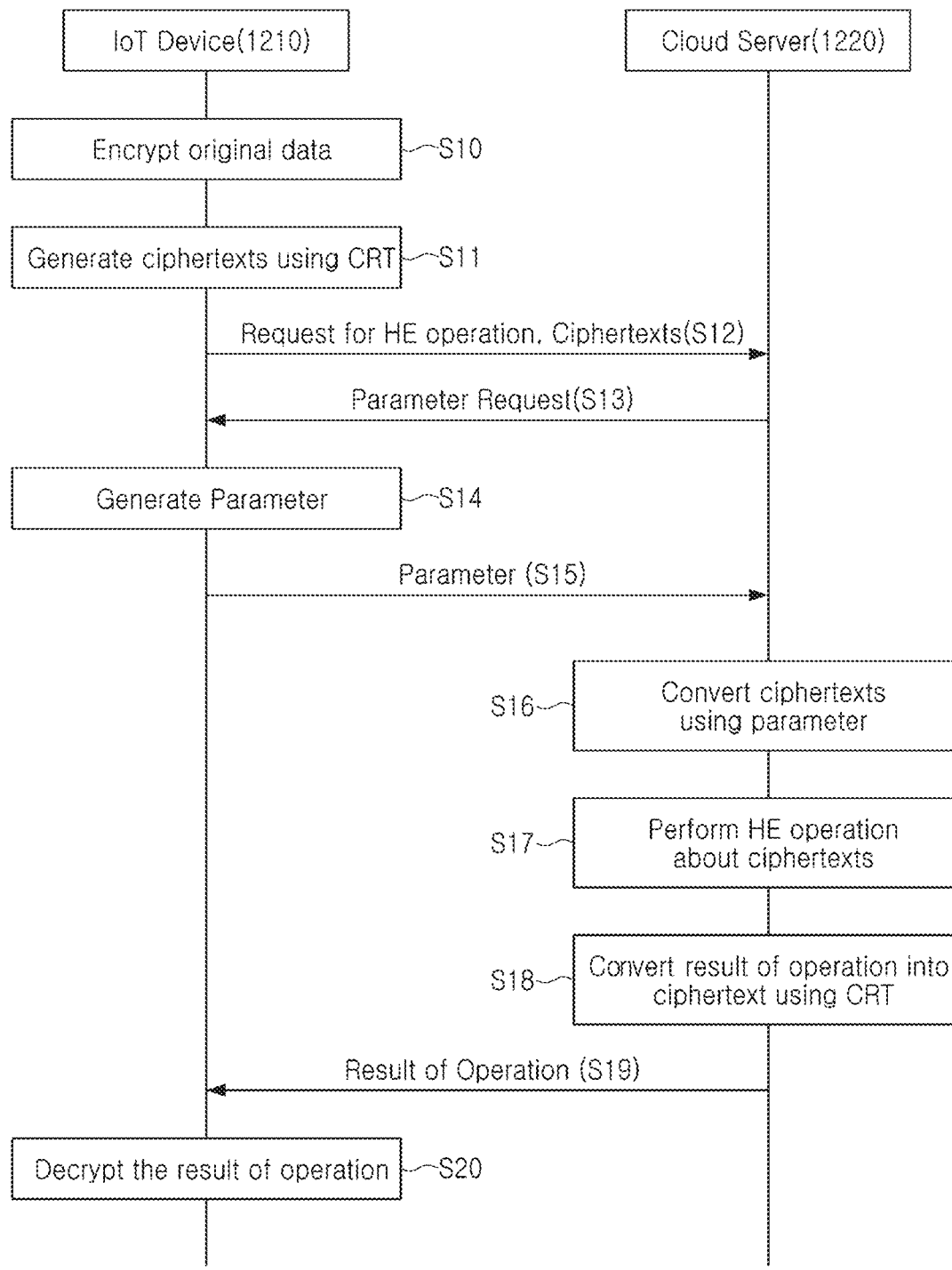
FIG. 12 is a ladder diagram schematically illustrating an operating method of a cloud system according to some example embodiments of inventive concepts.

FIG. 12 is a ladder diagram schematically illustrating an operating method of a cloud system according to some example embodiments of inventive concepts. Referring to FIG. 12, the cloud system may perform the homomorphic encryption operation as follows.

An internet of things (IoT) device 1210 may encrypt the original data using the homomorphic encryption algorithm (S10). The IoT device 1210 may generate the plurality of ciphertexts corresponding to the encrypted data each having the first operation size using the Chinese remainder theorem (S11). The IoT device 1210 may transmit a request for the homomorphic encryption operation on the ciphertexts to a cloud server 1220 (S12). That is, the IoT device 1210 may generate the ciphertexts which have L primes {$q_0$, $q_1$, . . . , $q_{L-1}$} each having the 64-bit size using the residue number system (RNS) and transmit the generated ciphertext to the cloud server 1220.

The cloud server 1220 may request the parameter indicating the second operation size from the IoT device 1210 in response to the request for the homomorphic encryption operation (S13). A public key used for the operation between the homomorphic ciphertexts may be referred to as an operation key. The cloud server 1220 may request the IoT device 1210 for the operation key for the primes used in the IoT device 1210 and an operation key for primes to be converted in the cloud server 1220.

The IoT device 1210 may generate the parameter in response to the request for the parameter (S14). Here, the parameter may indicate the set of primes corresponding to the second operation size. The IoT device 1210 may transmit the generated parameter to the cloud server 1220 (S15). That is, the IoT device 1210 may generate the operation keys required or used for the operation between the ciphertexts and transmit the generated operation keys to the cloud server 1220.

The cloud server 1220 may convert the ciphertexts each having the first operation size into the ciphertext having the second operation size using the parameter (S16). For example, the cloud server 1220 may generate the ciphertext having a size $Q=q_0q_1 \ldots q_{L-1}$ obtained by multiplying all the L primes by inversely operating the Chinese remainder theorem. The cloud server 1220 may select a new prime, e.g. one of $\{q'_0, q'_1, \ldots, q'_n\}$ with $Q'=q'_0q'_1 \ldots q'_n > 2Q$ to indicate the ciphertext in consideration of the homomorphic encryption operation and the operation unit to be supported by the server, convert the ciphertext indicated as Q into the residue number system of the new prime $\{q'_0, q'_1, \ldots, q'_n\}$ using the Chinese remainder theorem, and transmit the converted ciphertexts to the homomorphic encryption operation circuit of the cloud server 1220.

The homomorphic encryption operation circuit of the cloud server 1220 may perform the homomorphic encryption operation on the converted ciphertexts (S17). The cloud server 1220 may convert the operation result having the first operation size using the Chinese remainder theorem (S18).

The cloud server 1220 may transmit the converted operation result to the IoT device 1210 (S19). For example, the result of performing the encryption operation in the homomorphic encryption operation circuit may be indicated by the residue number system of $\{q'_0, q'_1, \ldots, q'_n\}$. Therefore, the cloud server 1220 may convert the ciphertext to $Q'=q'_0q'_1 \ldots q'_n$, using the Chinese remainder theorem, then convert the ciphertext to $\{q_0, q_1, \ldots, q_{L-1}\}$, which is the residue number system used by the IoT device 1210, and transmit the converted ciphertext to the IoT device 1210. The cloud server 1220 may perform the encryption operation and return its result to the IoT device 1210.

The IoT device 1210 may obtain the operation result by decrypting the converted operation result, based on the homomorphic encryption algorithm (S20).

Figure 13A:
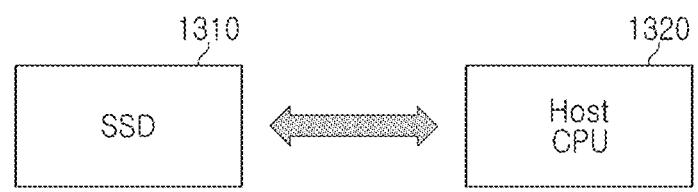
FIGS. 13A and 13B are views respectively schematically illustrating some example embodiments of inventive concepts to which a method of transmitting homomorphic encryption data is applied.
Figure 13B:
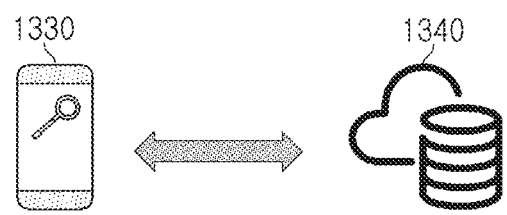

FIGS. 13A and 13B are views respectively schematically illustrating some example embodiments of inventive concepts to which a method of transmitting homomorphic encryption data is applied.

As illustrated in FIG. 13A, a storage device (e.g., solid state device (SSD)) 1310 may transmit, to a host CPU 1320, the homomorphic encryption data which use the first set of primes corresponding to the first operation size described with reference to FIGS. 1 to 12 and the parameter indicating the second set of primes corresponding to the second operation size. The host CPU 1320 may convert the homomorphic encryption data into the ciphertexts having the second operation size using the parameter. The host CPU 1320 may perform the homomorphic encryption operation on the converted ciphertexts and convert the operation result into the ciphertexts each having the first operation size.

As illustrated in FIG. 13B, in two-party communications, a mobile device 1330 may encrypt sensitive data x1, x2, . . . and xi and a desired operation (or function) f using the private key, and then transmit the same together with the operation key to a cloud server 1340. The cloud server 1340 may calculate c*, based on an encrypted algorithm (or circuit) for the user's desired service using the operation key.

The cloud server 1340 may then transmit c* to the mobile device 1330. The mobile device 1330 may obtain a result f(x1, x2, . . . and xi) of the desired service by decrypting c* using the private key. The cloud server 1340 is unable to identify what the user's data and the user's desired operation are, and may perform only the operation requested by the user.

The present inventive concept may be applicable to a hardware accelerator exclusively performing the homomorphic encryption operation.

Figure 14:
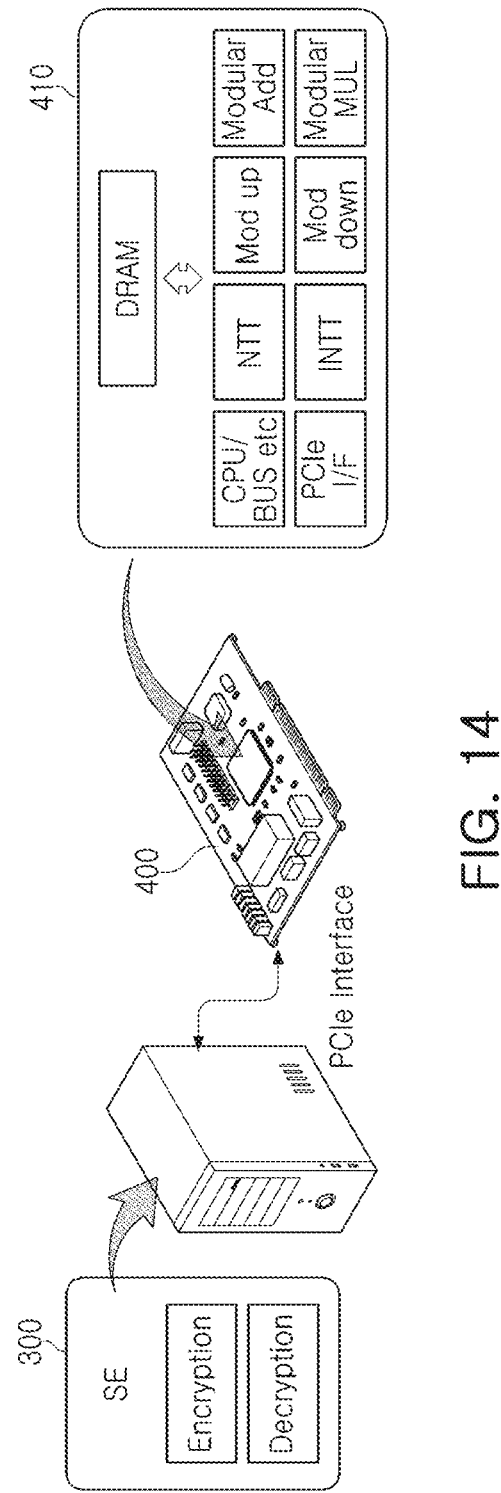
FIG. 14 is a view schematically illustrating a homomorphic encryption operation device having a homomorphic encryption operation hardware accelerator according to some example embodiments of inventive concepts.

FIG. 14 is a view schematically illustrating a homomorphic encryption operation device 400 having a homomorphic encryption operation hardware accelerator 410 according to some example embodiments of inventive concepts. Referring to FIG. 14, the homomorphic encryption operation device 400 may be coupled to a computer using a standard interface. The computer may implement the homomorphic encryption operation device 400 using the device driver. The homomorphic encryption operation device 400 may include the homomorphic encryption operation hardware accelerator 410. The homomorphic encryption operation hardware accelerator 410 may operate the homomorphic encryption of the different operation sizes as described with reference to FIGS. 1 to 13B.

The homomorphic encryption operation hardware accelerator 410 may include a DRAM, a modular multiplier, a modular adder, a mod up module, a mod down module, a number theoretic transform (NTT) module, an inversion number theoretic transform (INTT) module, CPU/BUS, a peripheral component interconnect express (PCIe) interface circuit or the like.

Meanwhile, inventive concepts may be applicable to an electronic device including the storage device.

Figure 15:
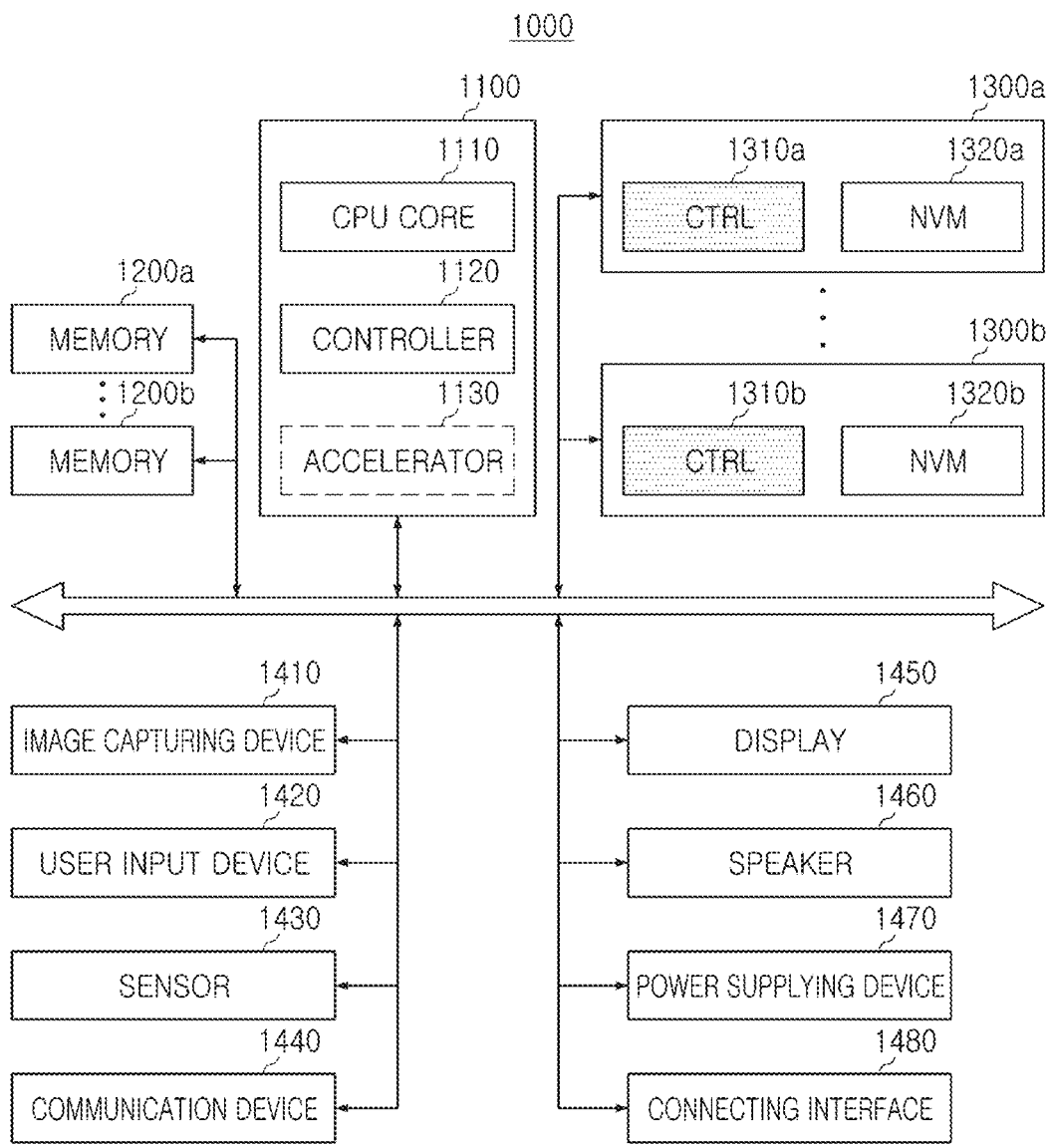
FIG. 15 is a view schematically illustrating an electronic device to which the storage device according to some example embodiments is applied.

FIG. 15 is a view schematically illustrating an electronic device 1000 to which the storage device according to some example embodiments of inventive concepts are applied. The electronic device 1000 illustrated in FIG. 15 may be basically a mobile system such as a portable communication terminal (or mobile phone), a smart phone, a tablet personal computer (PC), a wearable device, a health care device, or the internet of things (IoT) device. However, the electronic device 1000 illustrated in FIG. 15 is not necessarily limited to the mobile system, and may be a personal computer, a laptop computer, a server, a media player or an automotive device such as a navigation device.

Referring to FIG. 15, the electronic device 1000 may include a main processor 1100, memories 1200a and 1200b and storage devices 1300a and 1300b. In addition, the electronic device 1000 may further include at least one of an image capturing device 1410, a user input device 1420, a sensor 1430, a communications device 1440, a display 1450, a speaker 1460, a power supplying device 1470 and a connecting interface 1480.

The main processor 1100 may control an overall operation of the electronic device 1000, more specifically, operations of other components included in the electronic device 1000. The main processor 1100 may be a general-purpose processor, a dedicated processor, an application processor or the like.

The main processor 1100 may include one or more CPU cores 1110. In addition, the main processor 1100 may further include a controller 1120 controlling the memories 1200a and 1200b or the storage devices 1300a and 1300b. According to some example embodiments, the main processor 1100 may further include an accelerator 1130 which is a dedicated circuit for high-speed data operation such as artificial intelligence (AI) data operation. The accelerator 1130 may include one or more of a graphics processing unit (GPU), a neural processing unit (NPU), a data processing unit (DPU) or the like. Meanwhile, the accelerator 1130 may be implemented as a separate chip physically independent from the other components of the main processor 1100.

The memories 1200a and 1200b may be used as main memory devices of the electronic device 1000. The memory 1200a or 1200b may be a volatile memory such as synchronous RAM (SDRAM) and/or the dynamic RAM (DRAM), and may also be a non-volatile memory such as one or more of the flash memory, the phase-change RAM (PRAM) or the resistive random access memory (RRAM). The memories 1200a and 1200b may be positioned in the same package as the main processor 1100; however, example embodiments are not limited thereto.

The storage device 1300a or 1300b may be or may include a non-volatile storage device storing data regardless of whether power is supplied or not. The storage device 1300a or 1300b may have a relatively large storage capacity compared to the memory 1200a or 1200b. The storage devices 1300a and 1300b may include memory controllers 1310a and 1310b and non-volatile memories (NVM) 1320a and 1320b storing data under control of the memory controllers 1310a and 1310b. The non-volatile memory 1320a or 1320b may include a vertical NAND (V-NAND) flash memory having a two-dimensional (2D) structure and/or three-dimensional (3D), and may include another type of non-volatile memory such as the phase-change random access memory (PRAM) and/or redundant random access memory (RRAM).

In addition, the storage devices 1300a and 1300b may perform the encryption/decryption operations based on the homomorphic encryption operation as described with reference to FIGS. 1 to 13B.

One or both of storage devices 1300a and 1300b may be included in the electronic device 1000 while being physically separated from the main processor 1100. Alternatively or additionally, one or more of the storage devices 1300a and 1300b may be positioned in the same package as the main processor 1100. In addition, the storage device 1300a or 1300b may have the same shape as a solid state device (SSD) and/or a memory card, and thus be detachably coupled with the other components of the electronic device 1000 through an interface such as the connecting interface 1480. The storage device 1300a or 1300b may be a device to which a standard protocol such as one or more of a universal flash storage (UFS), an embedded multi-media card (eMMC) or a non-volatile memory express (NVMe) is applied, and may not be necessarily limited thereto.

The image capturing device 1410 may capture a still image or a moving image. The image capturing device 1410 may be one or more of a camera, a camcorder or a webcam.

The user input device 1420 may receive various types of data input from a user of the electronic device 1000, and may be one or more of a touch pad, a keypad, a keyboard, a mouse, a microphone or the like.

The sensor 1430 may detect various types of physical quantities which may be obtained from outside the electronic device 1000, and may convert the detected physical quantities into an electrical signal. The sensor 1430 may be or may include one or more of a temperature sensor, a pressure sensor, an illuminance sensor, a position sensor, an acceleration sensor, a biosensor, a gyroscope sensor or the like.

The communications device 1440 may transmit and receive wired/wireless signals to and from other devices outside the electronic device 1000 according to various communications protocols. The communications device 1440 may include one or more of an antenna, a transceiver, a modem or the like.

The display 1450 and the speaker 1460 may respectively function as output devices outputting visual and auditory information to the user of the electronic device 1000.

The power supplying device 1470 may appropriately convert power supplied from a battery embedded in the electronic device 1000 or an external power source, and may supply the converted power to each component of the electronic device 1000.

The connecting interface 1480 may connect the electronic device 1000 and an external device which is connected to the electronic device 1000 and may exchange data with the electronic device 1000 to each other. The connecting interface 1480 may be implemented using various interface methods such as one or more of an advanced technology attachment (ATA), a serial-ATA (SATA), an external SATA (e-SATA), a small computer small interface (SCSI), a serial attached SCSI (SAS), a peripheral component interconnection (PCI), a PCI-express (PCI-E), the non-volatile memory express (NVMe), Institute of Electrical and Electronics Engineers (IEEE) 1394, a universal serial bus (USB), a secure digital (SD) card, a multi-media card (MMC), the embedded MMC (eMMC), the universal flash storage (UFS), an embedded universal flash storage (eUFS), a compact flash (CF) card interface or the like.

Meanwhile, the memory controllers 1310a and 1310b may perform a series of operations for transmitting the homomorphic encryption data, illustrated in FIG. 15. However, inventive concepts are not limited thereto. The electronic device of inventive concepts may include a security module independently performing a series of operations for transmitting the homomorphic encryption data.

Meanwhile, inventive concepts may be applicable to a universal flash storage (UFS) SYSTEM.

Figure 16:
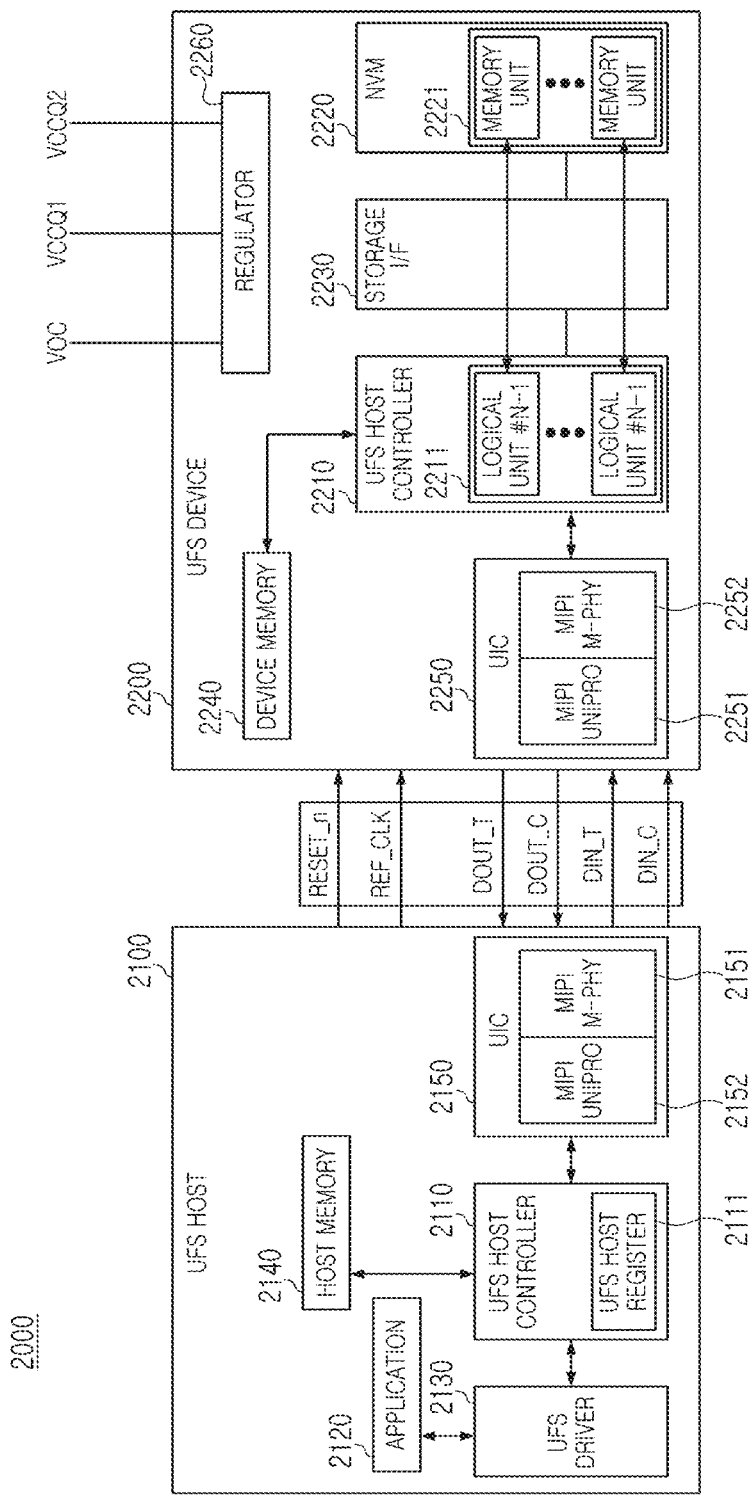
FIG. 16 is a view schematically illustrating a UFS system according to some example embodiments of inventive concepts.

FIG. 16 is a view schematically illustrating a UFS system 2000 according to some example embodiments of inventive concepts. The UFS system 2000 may be a system based on the UFS standard announced by Joint Electron Device Engineering Council (JEDEC), and may include a UFS host 2100, a UFS device 2200 and a UFS interface 2300. Referring to FIG. 16, the UFS host 2100 and the UFS device 2200 may be connected with each other through the UFS interface 2300.

When the main processor 1100 in FIG. 16 is the application processor, the UFS host 2100 may be a portion of the corresponding application processor. A UFS host controller 2110 and a host memory 2140 may respectively correspond to the controller 1120 and memories 1200a and 1200b of the main processor 1100 in FIG. 11. The UFS device 2200 may correspond to the storage device 1300a or 1300b in FIG. 11, and a UFS device controller 2210 and a non-volatile memory 2220 may respectively correspond to the memory controller 1310a or 1310b and non-volatile memory 1320a or 1320b in FIG. 11.

The UFS host 2100 may include the UFS host controller 2110, an application 2120, a UFS driver 2130, the host memory 2140, and a UFS interconnect (UIC) layer 2150. The UFS device 2200 may include the UFS device controller 2210, the non-volatile memory 2220, a storage interface 2230, a device memory 2240, a UIC layer 2250 and a regulator 2260. The non-volatile memory 2220 may include a plurality of memory units 2221, and the memory units 2221 may include the vertical NAND (V-NAND) flash memory having a two-dimensional (2D) structure or three-dimensional (3D), and may include another type of non-volatile memory such as the phase-change random access memory (PRAM) and/or the redundant random access memory (RRAM). The UFS device controller 2210 and the non-volatile memory 2220 may be connected with each other through the storage interface 2230. The storage interface 2230 may comply with a standard protocol such as toggle or open NAND flash interface (ONFI).

The application 2120 may be a program required or used to communicate with the UFS device 2200 to use a function of the UFS device 2200. The application 2120 may transmit an input-output request (IOR) to the UFS driver 2130 for input/output to the UFS device 2200. The input/output request (IOR) may be the read request, write request and/or discard request of data, and is not necessarily limited thereto.

The UFS driver 2130 may manage the UFS host controller 2110 through a UFS-host controller interface (HCI). The UFS driver 2130 may convert the input/output request generated by the application 2120 to a UFS command defined by the UFS standard, and transmit the converted UFS command to the UFS host controller 2110. One input/output request may be converted into the plurality of UFS commands. The UFS command may be basically a command defined by a SCSI standard, and may also be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. In this process, a UFS host register 2111 of the UFS host controller 2110 may function as a command queue (CQ).

The UIC layer 2150 of the UFS host 2100 may include a MIPI M-PHY 2151 and a MIPI UniPro 2152, and the UIC layer 2250 of the UFS device 2200 may also include a MIPI M-PHY 2251 and a MIPI UniPro 2252.

The UFS interface 2300 may include a line for transmitting a reference clock REF_CLK, a line for transmitting a hardware reset signal RESET_n for the UFS device 2200, a pair of lines for transmitting a differential input signal pair DIN_t and DIN_c, and a pair of lines for transmitting a differential output signals DOUT_t and DOUT_c.

A frequency value of the reference clock REF_CLK provided from the UFS host 2100 to the UFS device 2200 may be one of four values of 19.2 MHz, 26 MHz, 38.4 MHz and 52 MHz, and is not necessarily limited thereto. The UFS host 2100 may change the frequency value of the reference clock REF_CLK during its operation, that is, while data transmission/reception is performed between the UFS host 2100 and the UFS device 2200. The UFS device 2200 may generate clocks having various frequencies, based on the reference clock REF_CLK provided from the UFS host 2100 using a phase-locked loop (PLL) or the like. In addition, the UFS host 2100 may set a value of a data rate between the UFS host 2100 and the UFS device 2200 through the frequency value of the reference clock REF_CLK. That is, the value of the data rate may be determined depending on the frequency value of the reference clock REF_CLK.

The UFS interface 2300 may support a multiple lanes, and each lane may be a differential line pair. For example, the UFS interface 2300 may include one receive lane and one transmit lane. In FIG. 16, the pair of lines for transmitting the differential input signal pair DIN_T and DIN_C may be included in the receive lane, and the pair of lines for transmitting the differential output signal pair DOUT_T and DOUT_C may be included in the transmit lane, respectively.

FIG. 16 illustrates one transmit lane and one receive lane, and the number of transmit lanes and receive lanes may be changed.

The receive lane and the transmit lane may transmit data using a serial communications method, and a full-duplex communications between the UFS host 2100 and the UFS device 2200 may be possible by a structure in which the receive lane and the transmit lane are separated from each other. That is, the UFS device 2200 may transmit data to the UFS host 2100 through the transmit lane while receiving data from the UFS host 2100 through the receive lane. In addition, the same lane may be used to transmit control data such as a command from the UFS host 2100 to the UFS device 2200 and user data that the UFS host 2100 is required or expected to store in or read from the non-volatile memory 2220 of the UFS device 2200. Accordingly, there is no need to further provide a separate lane for transmitting data between the UFS host 2100 and the UFS device 2200 in addition to the pair of receive lanes and the pair of transmit lanes.

The UFS device controller 2210 of the UFS device 2200 may control an overall operation of the UFS device 2200. The UFS device controller 2210 may manage the non-volatile memory 2220 through a logical unit (LU) 2211 which is a logical data storage unit. The number of LUs 2211 may be eight, and is not limited thereto. The UFS device controller 2210 may include a flash translation layer (FTL), and convert a logical data address transmitted from the UFS host 2100, e.g., logical block address (LBA) into a physical data address, e.g., physical block address (PBA) using address mapping information of the FTL. In the UFS system 2000, a logical block for storing the user data may have a size in a predetermined range. For example, a small or minimum size of the logical block may be set to 4 Kbytes. Meanwhile, the size of the logical block is not limited thereto.

The UFS device controller 2210 may perform an operation based on an input command when the command from the UFS host 2100 is input to the UFS device 2200 through the UIC layer 2250, and transmit a completion response to the UFS host 2100 when the operation is completed.

In some example embodiments, the UFS host 2100 may transmit a data storage command to the UFS device 2200 when the UFS host 2100 is required or expected to store the user data in the UFS device 2200. When receiving a response indicating that the user data is ready to be transmitted (ready-to-transfer) from the UFS device 2200, the UFS host 2100 may transmit the user data to the UFS device 2200. The UFS device controller 2210 may temporarily store the received user data in the device memory 2240, and store the user data temporarily stored in the device memory 2240 in a selected location of the non-volatile memory 2220, based on the address mapping information of the FTL.

In some example embodiments, the UFS host 2100 may transmit a data read command to the UFS device 2200 when the UFS host 2100 is required or expected to read the user data stored in the UFS device 2200. When receiving the command, the UFS device controller 2210 may read the user data from the non-volatile memory 2220, based on the data read command, and temporarily store the read user data in the device memory 2240. In this reading process, the UFS device controller 2210 may detect and correct an error in the read user data using an error correction code (ECC) engine embedded therein.

In more detail, the ECC engine may generate parity bits for written data which is to be written in the non-volatile memory 2220, and the generated parity bits may be stored in the non-volatile memory 2220 together with the written data. When reading data from the non-volatile memory 2220, the ECC engine may use the parity bits read from the non-volatile memory 2220 together with the read data to correct the error in the read data and output error-corrected read data.

In addition, the UFS device controller 2210 may transmit the user data temporarily stored in the device memory 2240 to the UFS host 2100. In addition, the UFS device controller 2210 may further include an advanced encryption standard (AES) engine. The AES engine may perform at least one of the encryption and decryption operations on data input to the UFS device controller 2210 using a symmetric-key algorithm.

The UFS host 2100 may sequentially store the commands to be transmitted to the UFS device 2200 in the UFS host register 2111, which may function as the command queue, and may sequentially transmit the commands to the UFS device 2200. Here, the UFS host 2100 may transmit a next command waiting in the command queue to the UFS device 2200 even when a previously transmitted command is still being processed by the UFS device 2200, that is, even before receiving a notification that a processing of the previously transmitted command is completed by the UFS device 2200. Accordingly, the UFS device 2200 may also receive the next command from the UFS host 2100 while processing the previously transmitted command. For example, 32 may be a large or maximum number (or queue depth) of commands which may be stored in the command queue. In addition, the command queue may be a circular queue type indicating the start and end of the command sequence stored in the queue through a head pointer and a tail pointer, respectively.

Each of the plurality of memory units 2221 may include a memory cell array and a control circuit controlling an operation of the memory cell array. The memory cell array may be a two-dimensional memory cell array or a three-dimensional memory cell array. The memory cell array may include a plurality of memory cells. Each memory cell may be a cell (i.e. single level cell, SLC) that stores information of one bit, and may be a cell that stores information of 2 bits or more, such as a multi-level cell (MLC), a triple level cell (TLC) or a quadruple level cell (QLC). The three-dimensional memory cell array may include vertical NAND strings vertically oriented so that at least one memory cell is positioned on another memory cell.

VCC, VCCQ, VCCQ2 or the like may be input to the UFS device 2200 as a power supply voltage. VCC may be a main power voltage for the UFS device 2200, and may have a value of 2.4 to 3.6 V. VCCQ may be a power supply voltage to supply a low range voltage, mainly for the UFS device controller 2210, and may have a value of 1.14 to 1.26 V. VCCQ2 may be a power supply voltage for supplying a voltage lower than VCC and higher than VCCQ, mainly for the input/output interface such as the MIPI M-PHY 2251, and may have a value of 1.7 to 1.95 V. The power supply voltages may be supplied for the respective components of the UFS device 2200 through the regulator 2260. The regulator 2260 may be a set of unit regulators respectively connected to different voltages among the above-mentioned power supply voltages.

Figure 17:
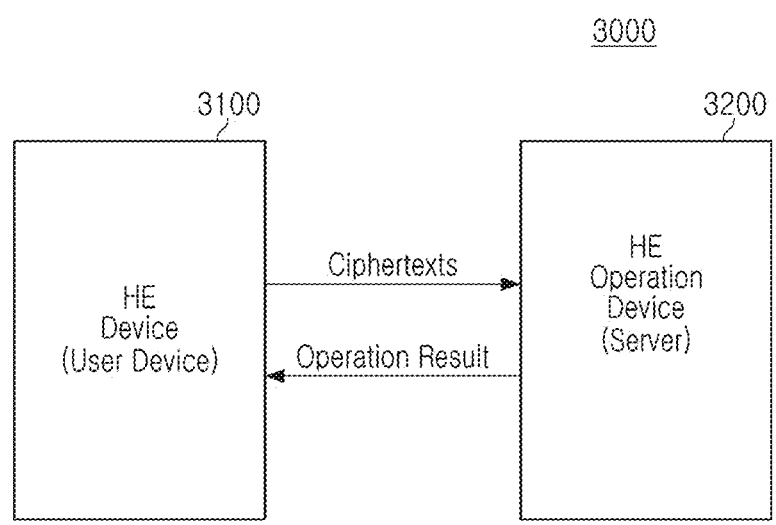
FIG. 17 is a view schematically illustrating a homomorphic encryption system according to some example embodiments of inventive concepts.

FIG. 17 is a view schematically illustrating a homomorphic encryption system 3000 according to some example embodiments of inventive concepts. Referring to FIG. 17, the homomorphic encryption system 3000 may include a homomorphic encryption device 3100 and a homomorphic encryption operation device 3200.

The homomorphic encryption device 3100 may convert the plaintext into the ciphertext and vice versa using the homomorphic encryption algorithm. In some example embodiments, the homomorphic encryption device 3100 may be a user device. For example, the user device may be any of various electronic devices. Here, the electronic device may be a storage device, a portable communications device (e.g., smartphone), a computer device, a portable multimedia device, a portable medical device, a camera, a wearable device or a home appliance device. In particular, the electronic device may be applied to an intelligent service (e.g., smart home, smart city, smart car or health care) based on wireless communications technology and internet of things (IoT)-related technology. The homomorphic encryption device 3110 may convert the ciphertext into the plurality of ciphertexts using the Chinese remainder theorem, generate the parameter indicating an operation size of the homomorphic encryption operation device 3200, and transmit the converted ciphertexts and the parameter to the homomorphic encryption operation device 3200.

The homomorphic encryption operation device 3200 may perform the operation on the ciphertexts transmitted from the homomorphic encryption device 3100. In some example embodiments, the homomorphic encryption device 3200 may be a server. For example, the server may provide a cloud service or an ultra-low latency service using distributed computing or mobile edge computing. In particular, the server may be an intelligent server using machine learning/ neural networks. The homomorphic encryption operation device 3200 may receive the ciphertexts and the parameter from the homomorphic encryption device 3100, convert the ciphertexts each having the operation size using the Chinese remainder theorem to perform the homomorphic encryption operation thereon, convert the operated ciphertext having an operation size of the homomorphic encryption device 3100 using the Chinese remainder theorem, and transmit the converted ciphertext to the homomorphic encryption device 3100.

The homomorphic encryption system according to some example embodiments of inventive concepts may include the homomorphic encryption device including a parameter generation circuit generating a parameter for converting a ciphertext which uses a set of primes A to a ciphertext which uses a set of primes B and a ciphertext conversion circuit converting the ciphertext which uses the set of primes A to the ciphertext which uses the set of primes B using the parameter.

A ciphertext generation method of the homomorphic encryption system according to some example embodiments of inventive concepts may include generating a parameter for converting a ciphertext which uses a set of primes A to a ciphertext which uses a different set of primes B; and converting the ciphertext which uses the set of primes A back to the ciphertext which uses the set of primes B using the parameter. In some example embodiments, a ciphertext conversion method may include converting a ciphertext by determining a specific or required set of primes of the ciphertext, based on a scenario of an operation between the ciphertexts having the plurality of set of primes.

As set forth above, the device for supporting the homomorphic encryption operation and/or an operating method thereof according to some example embodiments of inventive concepts may more simply perform the operation on the ciphertext having various operational sizes, by converting the ciphertext based on its operation size, and then operating on the same, for example by using the Chinese remainder theorem. This may increase performance and help streamline interaction between homomorphic encryption and homomorphic operation.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While various example embodiments have been illustrated and described above, it will be apparent to those of ordinary skill in the art that modifications and variations could be made without departing from the scope of inventive concepts as defined by the appended claims. Example embodiments are not necessarily mutually exclusive with one another. For example, some example embodiments may include one or more features described with reference to one or more figures, and may also include one or more features described with reference to one or more other figures.

What is claimed is:

1. A device for supporting a homomorphic encryption operation, the device comprising:
   a ciphertext conversion and homomorphic operation circuit configured to
   receive first ciphertexts corresponding a first operation size from homomorphic encryption device, wherein the first operation size is a first operating processing unit of the homomorphic encryption device,
   transform the first ciphertexts corresponding to a first operation size to second ciphertexts corresponding to a second operation size, wherein the second operation size is different from the first operation size and the second operation size is a second operating processing unit of the ciphertext conversion and homomorphic operation circuit,
   perform a homomorphic encryption operation on the second ciphertexts to generate operated ciphertexts,
   transform the operated ciphertexts having the second operation size to a third ciphertexts corresponding to the first operation size, and
   transmit the third ciphertexts to the homomorphic encryption device.

2. The device of claim 1, wherein the circuit is configured to receive a parameter used for converting the first ciphertexts to the second ciphertexts, the parameter received from the homomorphic encryption device.

3. The device of claim 2, wherein the parameter indicates a set of primes corresponding to the second operation size and is requested from the homomorphic encryption device.

4. The device of claim 1, wherein the circuit is configured to receive the first ciphertexts and to output an output ciphertext by inversely operating Chinese remainder theorem, and to convert the output ciphertext to the second ciphertexts using the Chinese remainder theorem according to the second operation size corresponding to each of a plurality of a set of primes.

5. The device of claim 4, wherein a multiplication of a modulus of each of the first ciphertexts is a modulus of the ciphertext.

6. The device of claim 1, wherein a number of the first ciphertexts and a number of the second ciphertexts are different from each other.

7. The device of claim 1, wherein
   the circuit is configured to convert the operated ciphertext to a fourth ciphertext by inversely operating Chinese remainder theorem according to the second operation size corresponding to each of a plurality of sets of primes, and
   to convert the fourth ciphertext to the third ciphertexts using the Chinese remainder theorem.

8. The device of claim 1, wherein
   the circuit is configured to perform the operation on ciphertexts corresponding to the first operation size, and
   the circuit is configured to convert the operated ciphertexts having the first operation size to ciphertexts corresponding to the second operation size.

9. The device of claim 1, wherein the first operation size is less than the second operation size.

* * * * *